(12) United States Patent
Trotter

(10) Patent No.: US 12,017,773 B2
(45) Date of Patent: *Jun. 25, 2024

(54) AERIAL FIREFIGHTING DUMP GATE SYSTEM

(71) Applicant: Victor D. Trotter, Fort Worth, TX (US)

(72) Inventor: Victor D. Trotter, Fort Worth, TX (US)

( * ) Notice: Subject to any disclaimer, the term of this patent is extended or adjusted under 35 U.S.C. 154(b) by 308 days.

This patent is subject to a terminal disclaimer.

(21) Appl. No.: 17/684,493

(22) Filed: Mar. 2, 2022

(65) Prior Publication Data

US 2023/0211881 A1    Jul. 6, 2023

Related U.S. Application Data

(63) Continuation-in-part of application No. 17/569,682, filed on Jan. 6, 2022.

(51) Int. Cl.
| | |
|---|---|
| *A62C 3/00* | (2006.01) |
| *A62C 3/02* | (2006.01) |
| *B64D 1/16* | (2006.01) |
| *F16K 1/20* | (2006.01) |
| *F16K 31/04* | (2006.01) |

(52) U.S. Cl.
CPC .............. *B64D 1/16* (2013.01); *A62C 3/0235* (2013.01); *F16K 1/2007* (2013.01); *F16K 1/2021* (2013.01); *F16K 31/047* (2013.01)

(58) Field of Classification Search
CPC .... E05F 15/63; E05F 11/02; E05Y 2201/216; E05Y 2201/434; E05Y 2201/624; E05Y 2201/676; E05Y 2201/716; E05Y 2201/722; E05Y 2400/354; E05Y 2900/502; F16D 11/14; F16H 1/22; A62C 3/0235; A62C 3/0242; A62C 3/0228; A62C 37/04; A62C 37/00; B64D 1/16; B64D 1/18

See application file for complete search history.

(56) References Cited

U.S. PATENT DOCUMENTS

| | | |
|---|---|---|
| 4,913,398 A | 4/1990 | Ziaylek, Jr. et al. |
| 4,936,389 A | 6/1990 | MacDonald et al. |

(Continued)

OTHER PUBLICATIONS

Linear Motors P10-70X400U brochure, Edition 24, from LinMot USA, Inc., located at N1922 State Road 120, Unit 1, Lake Geneva, WI 53147.

*Primary Examiner* — Chi Q Nguyen
(74) *Attorney, Agent, or Firm* — Dan Brown Law Office; Daniel R. Brown

(57) ABSTRACT

A dump gate system for a fluid hopper in a firefighting aircraft. A gate sealably engages a gate opening in the hopper at a closed position. The gate is hingedly connected about the gate opening, and a drive shaft is supported within the hopper. A crank arm is fixed to the drive shaft and is further coupled to the gate by a connecting link. The crank arm and the connecting link define an over-center geometry while the gate is at the closed position, such that weight of the fluid on the gate induces torque on the drive shaft in a gate-closing direction. A linear electric motor is selectively coupled to rotate the drive shaft in a gate-opening direction to thereby enable control of the fluid flow from the hopper according to an angular position of the drive shaft.

22 Claims, 21 Drawing Sheets

(56) References Cited

U.S. PATENT DOCUMENTS

| | | | |
|---|---|---|---|
| 5,279,481 A | 1/1994 | Trotter et al. | |
| 5,967,462 A | 10/1999 | Foster et al. | |
| 7,182,145 B2 | 2/2007 | Powers et al. | |
| 8,365,762 B1 | 2/2013 | Trotter | |
| 9,414,537 B2 * | 8/2016 | Trull | A01C 17/005 |
| 11,046,433 B2 * | 6/2021 | Trotter | B64D 1/16 |
| 11,542,742 B2 * | 1/2023 | Trotter | B64D 1/16 |
| 11,759,664 B2 * | 9/2023 | Trotter | B64D 1/16 169/53 |
| 2005/0087651 A1 * | 4/2005 | Powers | B64D 1/16 244/136 |
| 2014/0367128 A1 | 12/2014 | Parker | |
| 2020/0010196 A1 * | 1/2020 | Trotter | E05F 15/63 |
| 2021/0198934 A1 * | 7/2021 | Trotter | A62C 3/0235 |
| 2022/0024587 A1 * | 1/2022 | Trotter | B64D 1/16 |
| 2022/0296942 A1 * | 9/2022 | Trotter | E05F 15/63 |
| 2023/0038453 A1 * | 2/2023 | Trotter | A62C 3/0242 |
| 2023/0146980 A1 * | 5/2023 | Trotter | A62C 3/0235 169/53 |
| 2023/0211881 A1 * | 7/2023 | Trotter | F16K 1/2007 169/53 |

\* cited by examiner

Closed Gate

Just Open
Out of Phase

Fully Open

Inactive

Release Clutch

Pull Drive
Over-Center

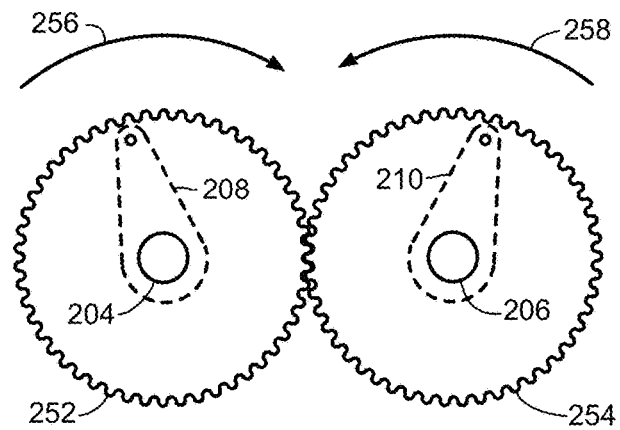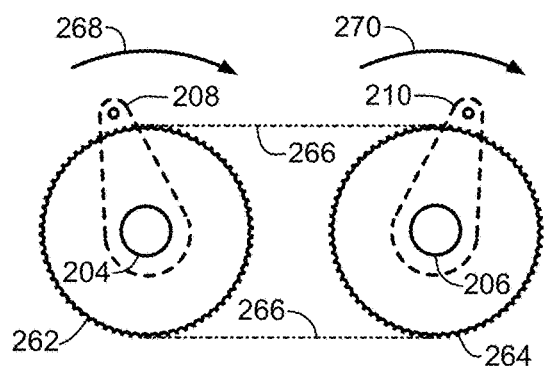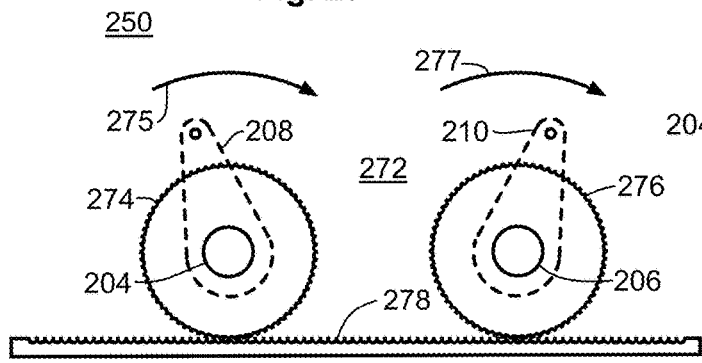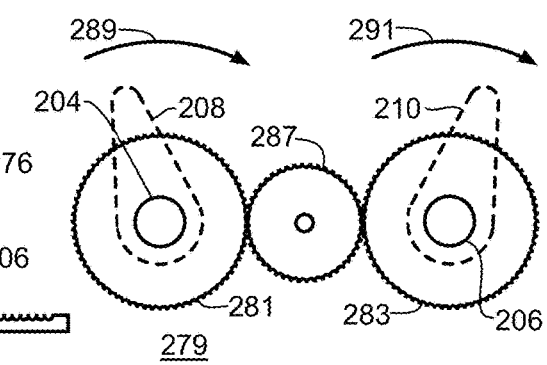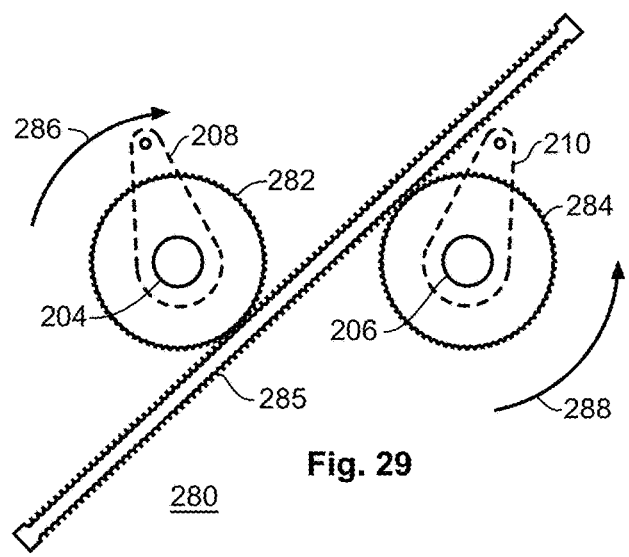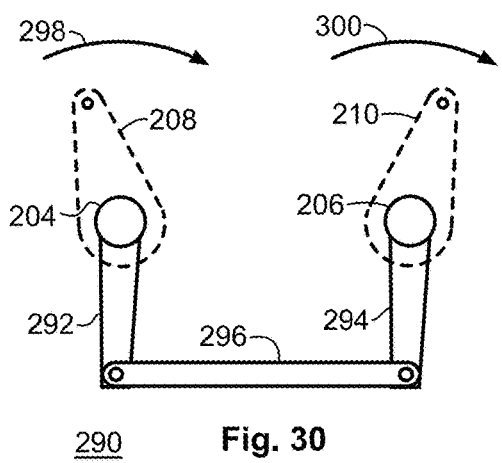

AERIAL FIREFIGHTING DUMP GATE SYSTEM

REFERENCES TO RELATED APPLICATIONS

This is a continuation in part of application Ser. No. 17/569,682 filed on Jan. 6, 2022, which was a continuation in part of application Ser. No. 17/386,721 filed on Jul. 28, 2021, now U.S. Pat. No. 11,759,664 issued on Sep. 12, 2023, which was a continuation in part of application Ser. No. 17/202,577 filed on Mar. 16, 2021, now U.S. Pat. No. 11,542,742 issued on Jan. 3, 2023, which was a continuation in part of application Ser. No. 16/030,147 filed on Jul. 9, 2018, now U.S. Pat. No. 11,046,433 issued on Jun. 29, 2021.

BACKGROUND OF THE INVENTION

Field of the Invention

The present invention relates to firefighting aircraft fire retardant dump gate systems.

Description of the Related Art

Firefighting aircraft, also referred to as air tankers, carry a volume of fire retardant, such as water or other chemicals, which are dumped onto designated areas for fire control operations. The fire retardant is carried in a tank or hopper within the aircraft and is released through the use of a dump gate. The release and targeting of the fire retardant is a critical operation due to the necessarily limited volume of fire retardant available on a given aircraft and the generally large areas of fire being attacked. Targeting calculations involve the air speed, altitude, wind speed, rate of climb/descent, volume of fire retardant to be dispersed, length and width of a predetermined target area, and the rate at which the fire retardant is dumped from the dump gate. As such, control of the dump gate opening and rate of flow are critical for targeting purposes.

U.S. Pat. No. 8,365,762, issued on Feb. 5, 2013 to Trotter, who is an inventor of the present disclosure, teaches a hydraulic control system used to operate a dump gate in a firefighting aircraft. In that design, hydraulics are advantageously employed because of their reliability, their ability to apply substantial forces to a pair of gates, and their ability to firmly and quickly control the position of the dump gates. A feedback control system was employed to provide precise position control of the gates. This system has a record of proven performance in certain models of firefighting aircraft from Air Tractors, Inc. (Olny, TX), including the AT-802F "Fire Boss" aircraft.

While hydraulics have been successfully employed for dump gate operation, hydraulics do carry certain liabilities. The hydraulic pump, actuators, reservoir, pipes and fittings are relatively heavy components, which weight must be deducted from the fire retardant payload. Hydraulics also introduce a new dynamic system in an aircraft, which also carries existing dynamic systems, such as the aircraft electric generators and storage batteries, and which might be more fully taken advantage of Hydraulics also create maintenance issues and potentials for leaking and other reliability issues. Thus, it can be appreciated that there is a need in the art for an improved dump gate and control system that addresses the problems in the prior art.

SUMMARY OF THE INVENTION

The need in the art is addressed by the systems taught by the present invention. The present disclosure teaches a dump gate system for a hopper that contains fluid in a firefighting aircraft, which includes a first gate opening in a lower portion of the hopper and a first gate that sealably engages the opening at a closed position to retain fluid in the hopper, and which is hinged to the first gate opening. A first drive shaft is supported within the hopper and rotates in a gates-opening and gates-closing directions, and where the shaft extension is located outside of the hopper. A first crank arm is fixed to the first drive shaft and coupled to the first gate by a first connecting link. There is also a first drive crank fixed to the shaft extension. An electric linear actuator, that includes a linear electric driver and an actuator rod. The linear electric operates to extend and retract the actuator rod. The the actuator rod is pivotally attached to a distal end of the first drive crank, and the linear electric driver fixed in position with respect to the hopper by an anchor pivot. A linear drive controller is connected to provide electric current to the linear electric driver so as to selectively extend and retract the actuator rod such that the drive crank induces rotation of the first drive shaft in either of the gates-opening or the gates-closing directions. In operation, rotation of the first drive shaft in the gates-opening direction is coupled through the first crank arm and the first connecting link to open the first gate, to thereby control fluid flow from the hopper according to positioning of the actuator shaft by the linear drive controller.

In a specific embodiment of the foregoing system, the linear drive controller and the electric linear actuator apply holding torque though the drive crank and to the first drive shaft to prevent its rotation.

In a specific embodiment of the foregoing system, the electric linear actuator is a linear electric motor including an electromagnetic stator and permanent magnet slider, which correspond with the linear electric driver and the actuator rod, respectively. In another specific embodiment of the foregoing system, the electric linear actuator is a ball screw actuator including a threaded rod and motor driven ball screw driver, which correspond with the actuator rod and the linear electric driver, respectively.

In a specific embodiment, the foregoing system further includes a brake disposed in fixed relationship with the hopper that operates to selectively prevent rotation of the first drive shaft.

In a specific embodiment of the foregoing system, the first crank arm and the first connecting link define an over-center geometry while the first gate is at the closed position, such that weight of the fluid on the first gate induces torque on the first drive shaft in the gates-closing direction.

In a specific embodiment, the foregoing system further includes a linear position sensor electrically coupled to the linear drive controller, and aligned to detect the extension position of the actuator rod, so as to provide actuator rod position feedback to the linear drive controller.

In a specific embodiment, the foregoing system further includes a second gate opening located adjacent a lower portion of the hopper and a second gate that sealably engages the second gate opening at a closed position to retain the fluid in the hopper. A second crank arm is fixed to the first drive shaft and coupled to the second gate by a second connecting link. And, wherein rotation of the first drive shaft in the gates-opening direction is coupled to the second gate by the second crank arm and the second connecting link to open the second gate, thereby enabling control of the fluid flow from the hopper according to an angular position of the first drive shaft. In a refinement to this embodiment, the first and second crank arms and the first and second connecting links are configured with a geometry whereby the first gate and the second gate open out of phase with one another as the first drive shaft is rotated in the gate-opening direction.

The present disclosure further teaches a dump gate system for a hopper that contains fluid in a firefighting aircraft that includes a first and a second gate openings formed through a lower portion of the hopper with first and second gates that sealably engage the first and second gate openings, respectively, at closed positions to retain the fluid in the hopper, where both gates are hinged to the gate openings. A first and a second drive shafts are rotatably supported within the hopper, where the first drive shaft has a shaft extension exterior of the hopper. First and second cranks arm are fixed to the first and second drive shafts, respectively, and are coupled to the first and second gates by first and second connecting links. A shaft synchronizer engages with the first and second drive shafts to synchronize their rotation in respective gate-opening and gate-closing directions. A first drive crank fixed to the shaft extension. An electric linear actuator, which includes a linear electric driver and an actuator rod, operates to extend and retract the actuator rod. The actuator rod is pivotally attached to a distal end of the first drive crank, and the linear electric driver is fixed in position with respect to the hopper by an anchor pivot. A linear drive controller is connected to provide electric current to the linear electric driver to selectively extend and retract the actuator rod such that the drive crank induces rotation of the first drive shaft in either of the gates-opening or the gates-closing directions, and which correspondingly drives the second drive shaft through the shaft synchronizer. In operations, rotation of the first and second drive shafts in the gates-opening directions is coupled through the first and second crank arms and the first and second connecting links to open the first and second gates, and to enable control of the fluid flow from the hopper according to positioning of the actuator shaft by the linear drive controller.

In a specific embodiment of the foregoing system, the shaft synchronizer further includes a first phasing crank fixed to the first drive shaft and a second phasing crank fixed to the second drive shaft, and a phasing link pivotally coupling distal ends of the first and second phasing cranks to synchronize rotation of the first and second drive shafts.

In a specific embodiment of the foregoing system, the linear drive controller and the electric linear actuator apply holding torque to the first and second drive shafts against rotation thereof.

In a specific embodiment of the foregoing system, the electric linear actuator is a linear electric motor including an electromagnetic stator and permanent magnet slider that correspond with the linear electric driver and the actuator rod, respectively. In another specific embodiment, the electric linear actuator is a ball screw actuator including a threaded rod and motor driven ball screw driver that correspond with the actuator rod and the linear electric driver, respectively.

In a specific embodiment, the foregoing system further includes a brake disposed in fixed relationship with the hopper and operable to selectively prevent rotation of the first and second drive shafts.

In a specific embodiment of the foregoing system, the first and second crank arms and the first and second connecting links define an over-center geometry while the first and second gates are at the closed positions, such that weight of the fluid on the first and second gates induces torque on the first and second drive shafts in the gates-closing directions.

In a specific embodiment, the foregoing system further includes a linear position sensor electrically coupled to the linear drive controller, and aligned to detect an extension position of the actuator rod, so as to provide actuator rod position feedback to the linear drive controller.

In a specific embodiment of the foregoing system, the first and second crank arms and the first and second connecting links are configured with a geometry whereby the first and second gates open out of phase with one another as the first and second drive shafts are rotated in the gate-opening directions.

The present disclosure further teaches a dump gate system for a hopper that contains fluid in a firefighting aircraft that includes first and second gate openings formed through a lower portion of the hopper with first and second hinged gates that sealably engage the openings at closed positions so as to retain the fluid in the hopper. The system includes first and second drive shafts, that are rotatably supported within the hopper to rotate in either a gates-opening or a gates-closing directions. The first drive shaft has a first shaft extension located exterior of the hopper, and the second drive shaft has a second shaft extension located exterior of the hopper. The system further includes first and second cranks arm fixed to the first and second drive shafts, respectively, which are coupled to the first and second gates by first and second connecting links, respectively. A first drive crank is fixed to the first shaft extension, and a second drive crank fixed to the second shaft extension. The system further includes a first electric linear actuator, with a first linear electric driver that operates to extend and retract a first actuator rod, wherein the first actuator rod is pivotally attached to a distal end of the first drive crank. The first linear electric driver is fixed in position with respect to the hopper by a first anchor pivot. The system further includes a second electric linear actuator, with a second linear electric driver that operates to extend and retract a second actuator rod, wherein the second actuator rod is pivotally attached to a distal end of the second drive crank. The second linear electric driver is fixed in position with respect to the hopper by a second anchor pivot. A linear drive controller is coupled to provide electric current to the first and second linear electric driver to enable selective extension and retraction of the first and second actuator rods such that the first and second drive cranks induce rotation of the first and second drive shafts, respectively, in either of the gates-opening or the gates-closing directions. In operation, rotation of the first and second drive shafts in the gates-opening directions is coupled through the first and second crank arms and the first and second connecting links to open the first and second gates, and to thereby enable control of the fluid flow from the hopper according to positioning of the actuator shaft by the linear drive controller.

In a specific embodiment of the foregoing system, the first and second electric linear actuators are linear electric motors including an electromagnetic stators and permanent magnet sliders that correspond with the linear electric drivers and the actuator rods, respectively.

In a specific embodiment of the foregoing system, the first and second crank arms and the first and second connecting links define an over-center geometry while the first and second gates are at the closed positions, such that weight of the fluid on the first and second gates induces torque on the first and second drive shafts, respectively, in the gates-closing directions.

In a specific embodiment, the foregoing system further includes first and second linear position sensors electrically coupled to the linear drive controller, and aligned to detect the extension position of the first and second actuator rods, to thereby provide actuator rods position feedback to the linear drive controller.

BRIEF DESCRIPTION OF THE DRAWINGS

FIG. 25 is an end view drawing of a gear-coupled shaft synchronizer according to an illustrative embodiment of the present invention.

FIG. 26 is an end view drawing of a belt or chain coupled shaft synchronizer according to an illustrative embodiment of the present invention.

FIG. 27 is an end view drawing of a pinion-gear and geared-rack type shaft synchronizer according to an illustrative embodiment of the present invention.

FIG. 28 is an end view drawing of a gear-coupled shaft synchronizer employing and idler gear according to an illustrative embodiment of the present invention.

FIG. 29 is an end view drawing of a pinion-gear and geared-rack type shaft synchronizer according to an illustrative embodiment of the present invention.

FIG. 30 is an end view drawing of a crank arm type shaft synchronizer according to an illustrative embodiment of the present invention.

DESCRIPTION OF THE INVENTION

Figure 1:
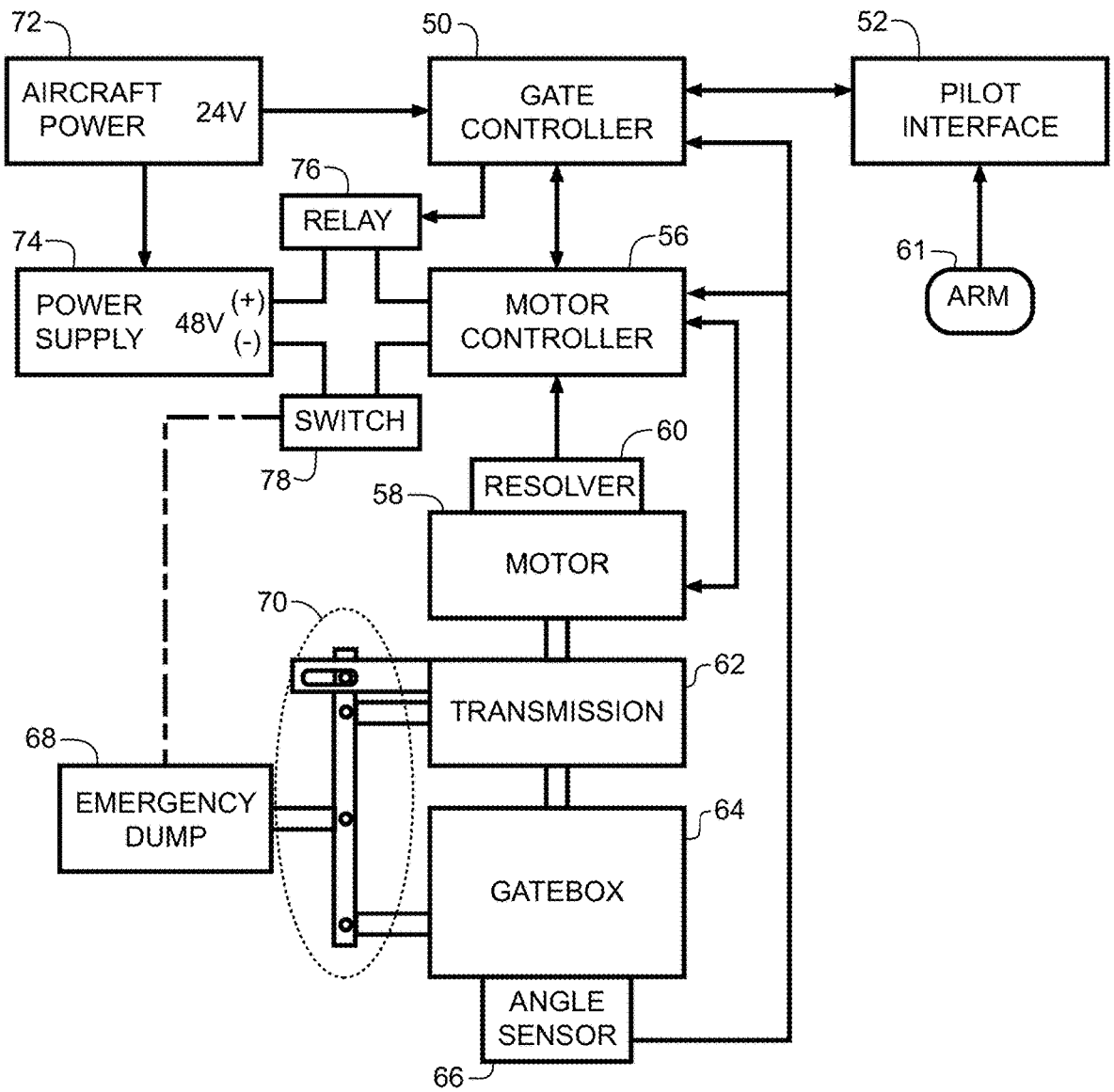
FIG. 1 is a functional block diagram of a fire retardant delivery system according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various compositions, apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

In an illustrative embodiment of the present disclosure, the Air Tractor 802F fire fighting aircraft is the host for the gatebox assembly together with its related control equipment. This is also referred to as a "firegate." Functionally speaking, the gatebox is the discharge valve system used to dispense fire retardant from the aircraft, and plays a critical role in the efficient utilization of the limited quantity of fire retardant available in any given drop flight. The Air Tractor 802F is a single engine air tanker with an 800 gallon payload that is purpose built for aerial firefighting. The aircraft drops the payload through an opening in the belly of the fuselage. This disclosure contemplates improvement to the prior art gatebox systems, which is commercially referred to as the third generation fire retardant drop system, ("GEN III FRDS"). The present disclosure presents an electrically driven mechanical gate system, together with an electrical system, which controls the position of the gate doors to meter the flow of fire retardant from the AT-802F fire retardant hoppers. Long term retardant and other liquid payloads may be used in the hoppers as necessary for various firefighting missions.

A typical fire retardant release takes a minimum of approximately one-half second, and up to a maximum of about 10 seconds depending on gate controller settings, which dynamically control the firegate opening size and duration. The controller has an interface module located in the cockpit while all other electronic equipment is mounted outside of the cockpit. Reference is directed to FIG. 1, for an introduction of the system components. The gatebox 64 and control system components include multiple electrical boxes to perform various functions and a mechanical gate system with moving doors coupled to an actuator. All components are protected by circuit breakers of appropriate size. The primary components include a pilot interface 52, a gate controller 50, a motor controller 56, an electric motor 58, a gatebox 64, a transmission 62, and an emergency dump system 68, 70. In addition, there is a power supply 74 that interfaces with the aircraft power system 72.

Figure 2:
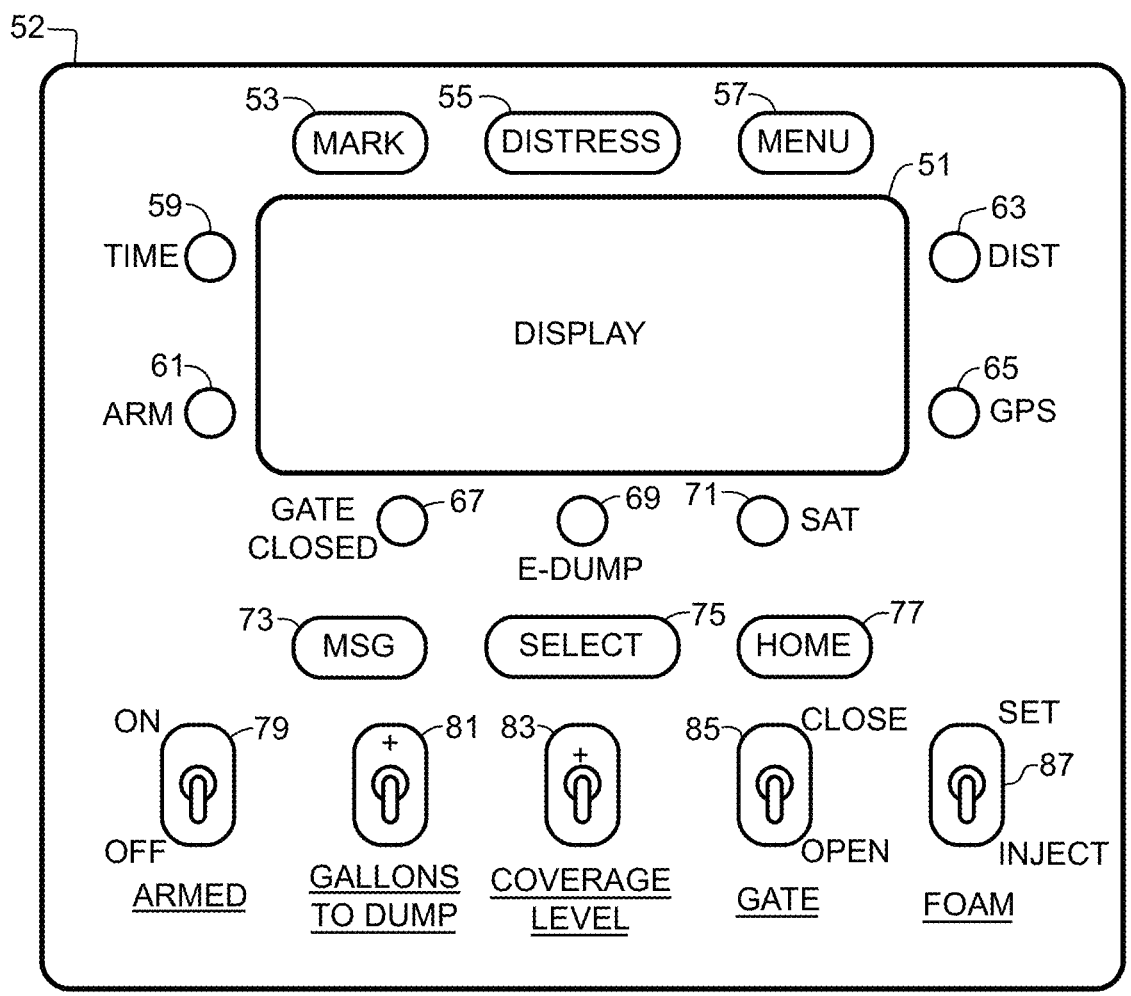
FIG. 2 is a drawing of a pilot interface according to an illustrative embodiment of the present invention.

The pilot interface 52 is powered by the gate controller 50 and is the means by which various system settings are primarily controlled. Now referring to FIG. 2, the pilot interface 52 consists of a display module 51 and various switches and indicators. The display module 51 is in an aluminum case with a silicone membrane type keypad. The LCD display 51 is mounted behind a sealed piece of glass. The pilot interface 52 provides messages and system status to the pilot, and accepts inputs from plural actuators 53, 55, 57, 73, 75, 77, 79, 81, 83, 85, and 87 and one push button/rotary encoder. Plural indicating lamps are also provided; 59, 61, 63, 65, 67, 69, and 71.

The pilot interface 52 push buttons include a Mark button 53, which is used for telemetry system only, and defines points of interest. A Distress button 55 is also used for the telemetry system only, and activates transmission of a distress signal. A Menu button 57 enters and exits controller menus operations. A Home button 77 returns the display 51 to a home screen. A MSG (Message) button 73 is also used for the telemetry system only, and receives text messages sent to the unit. A Select actuator 75 is a scroll and select device used to access menu options present on the display 51.

The pilot interface 52 also comprises indicator lamps, including a time mode status lamp 59, which is related to GPS tracking intervals. It also includes an ARMED status indicator 61, which will be more fully discussed hereinafter. It also includes an emergency dump (E-DUMP) system status indicator lamp 69, which will also be more fully discussed hereinafter. It also includes a satellite modem (SAT) connectivity status indicator 71, which is related to telemetry functions. It also includes a GPS connectivity indicator 65, which is also related to gate and telemetry functions. It also includes a distance mode (DIST) status indicator 63, which is related to GPS tracking intervals.

The pilot interface 52 also includes plural toggle switches below the display area, as follows. An ARMED switch 79, which is turned on to arm the system prior to dumping fire retardant through the gatebox. There is also a Gallons To Dump switch 81, which enables the pilot to adjust the volume of fire retardant to be dumped. There is also a Coverage Level switch 83, which enables the pilot to set the fire retardant cover level of each dump. There is a also a Gate Open/Close switch 85, which enables the pilot to drive the gates open or closed, and is also used to calibrate the closed position setting. Finally, there is a FOAM switch 87, which allows for injecting foam into the system.

Now referring back to FIG. 1, the gate controller 50 is the main control box for the system, and provides the following function. The gate controller 50 accepts inputs from the pilot interface 52, thereby enabling the pilot to set system parameters. The gate controller 50 connects to the various feedback devices such as sensors and switches. The gate controller 50 provides the microprocessors used to control logic functions for the system. The gate controller 50 performs calculations for the requisite gate angle to meet targeted drop rates based on sensor inputs. The gate controller 50 provides feedback to the motor controller 56. The gate controller 50 performs passive diagnostics and system self-tests. The gate controller 50 provides power and signals to the pilot interface 52. The gate controller 50 contains an accelerometer to sense the acceleration of the aircraft. The gate controller 50 provides Automated Flight Following (AFF) and Additional Telemetry Unit (ATU) functions. The gate controller 50 records and transmits firefighting event data via cellular or satellite modems. The gate controller 50 contains a GPS module to determine location of aircraft.

Continuing in FIG. 1, the motor controller 56 processes commands from the gate controller 50 and communicates them to the electric motor 58. The motor controller 56 also converts the 24 volt (nominal) aircraft bus power to three-phase AC power required to drive the electric motor, which is a three-phase rotating-field motor with a permanent magnet rotor. In other embodiments, a 48 volt (nominal) power supply is employed to yield higher motor torque and power ratings. The motor controller may also maintain a motor shaft position and rotation count by reading an optional resolver 60 that rotates together with the motor 58. Other sensor technologies could be employed for the resolver function including incremental encoders, absolute encoders, rotary and linear potentiometers, linear LVDT or potentiometers with a crack arm, as are known to those skilled in the art. In the illustrative embodiment, the motor is a Heinzmann GmbH (www.heinzmann.com) model PMS 100 series permanent magnet synchronous motor.

Note that the gate controller 50 further includes an internal supervisor circuit to provides redundancy by providing a discrete input signal to the motor controller 56 to open the gates if a normal drop command does not initiate gate movement within 0.8 seconds. This supervisor circuit is hardware driven and requires no software within the gate controller 50 to command the motor controller 56. It should be noted that as the gate box 64 opens the gates (not shown) the weight of the fire retardant therein urges the gates to open with a substantial amount of force. This force is coupled through the transmission 62 and into the motor 62, urging it to rotate more quickly. As such, the motor must act as a brake against an overly-rapid and uncontrolled gate opening. Or, some sort of mechanical brake may be required. In an illustrative embodiment, the motor 58 and motor controller 56 provide a regenerative braking action whereby that force is converted to electric current in the motor 56, which is back fed into the power supply 74, comprising the batteries (not shown). As such, regenerative braking is realized and the batteries are somewhat recharged during the fire retardant dump process. This offsets the electric power demand placed on the aircraft by the system of the present disclosure.

The gatebox system, as generally depicted in FIG. 1, includes a number of system sensors that provide parametric inputs to the gate controller 50. A hopper volume sensor (not shown) outputs a voltage proportional to the rotary position of a hopper float shaft. The gate controller 50 calculates the gallons in the hopper based on this voltage for use during drops and for display to the pilot and ground loading crew. This sensor is mounted onto the rear hopper of the aircraft. A gatebox angle sensor 66 outputs an analog voltage that is proportional to the rotary position of the gate drive shaft (discussed hereinafter). The gate controller 50 uses this signal when controlling the gatebox gate angle in normal mode only. In an alternative embodiment, a linear sensor (not shown) may be employed, which measures the gate opening directly, and which is also couple to the Gate Controller 50. When either of the angle sensor 66 or the linear sensor are employed, the use of the resolver 60 is optional. This is because when the gate position is measured, it is not essential to keep track of the motor's annular position for the detection of gate positions. These two approaches represent two options available to the designer.

An accelerometer (not shown) is provided within the gate controller 50, and provides the control system with a voltage proportional to the acceleration of the aircraft. This is used by the controller for flow rate and door angle calculations in normal mode only. In addition, a Hall effect sensor (not shown) is internal to the motor and outputs a signal to the motor controller 56 for position feedback control. A temperature sensor (not shown) also provides the motor controller 56 with the internal temperature of the motor, which can be used for diagnostics. Both sensor signals exit the motor 58 through a common cable for connection to the motor controller 56.

Continuing in FIG. 1, the electric motor 58 is an AC powered servo-motor, which is used to open and close the gatebox gates. This motor 58 is controlled by the gate controller 50 through the motor controller 56 during normal system operation to precisely control the angle of the gatebox 64 gates (not shown) to achieve constant flow out of the aircraft hoppers (not shown). The motor 58 is coupled to a drive shaft (not shown) in the gatebox 64 by a splined connection to a transmission 62, which comprises a gear reduction therein. The transmission 62 reduces the motor 58 shaft speed to achieve an appropriate output speed. The transmission 62 also multiples the motor's 58 output torque in order to provide sufficient torque to open and close the gates (not shown). Note that the motor controller 56 converts DC input power to a variable frequency and current three-phase AC power to the motor to achieve control.

The primary source of power in FIG. 1 is the aircraft power bus 72, which typically provides 24 volts DC nominal power to the gate controller 50. In some embodiments, the motor controller 56 may be selected to operate on 24 volts. However, in other embodiments, the motor controller 56 is selected to operate on 48 volts DC (nominal). The higher voltage enables the use of motors with higher power and torque ratings. In order to provide a motor controller input voltage greater than the aircraft power bus 72 voltage, and power supply 74 is added, which provides the increased voltage. Details and options for achieving this increased voltage will be more fully discussed hereinafter.

In the event of a complete failure of the gatebox system of FIG. 1, it is necessary to provide an emergency dump system for safety reasons. This is achieved with an emergency dump actuator 68 that is coupled to the electrical system through a switch 78, and to the transmission 62 and gatebox 64 using a mechanical linkage 70. The transmission 62 includes a clutch (not shown) that disengages the motor 58 from the gatebox 64 upon actuation of the emergency dump 68. Actuation also applies a rotating force on the drive shaft (not shown) in the gatebox 64 to move it past an over-center position, which enables the gates (not shown) to fall open and dump the fire retardant. The over-center mechanical arrangement will be more fully discussed hereinafter. The switch 78 disconnects the DC power supply 74 from the motor controller 56 upon actuation of the emergency dump 68 to ensure that the motor 58 cannot apply any rotational force to the system. This system and its functions will be more fully discussed hereinafter.

The gatebox system (or "system") can be operated in normal mode using the control logic to open and close the gates in response to a selected Coverage Level and Gallons to Dump. In an alternative mode of operation, the system may be operated in a manual mode, where the gate controller 50 functions are entirely omitted. In this mode, only OPEN and CLOSE actuators are provided, which directly control the motor controller 56. Such an arrangement is considerably less expensive to implement. In the manual mode, the operator uses a third party display and the OPEN and CLOSE switches to meter flow manually. Now, returning to the Gate Controller 50 operated system, once the pilot initiates a drop by depressing the drop trigger, the controller will open the doors and adjust the door angle to maintain a constant flow rate from the hoppers. When the selected gallons to dump have been evacuated, the doors close to capture any remaining fluid in the hoppers. The control system will compensate for various dynamics during the drop event. Table 1 presents a summary of function of the system.

TABLE 1

| Parameter | Device Type | Action | Comments |
|---|---|---|---|
| Dump Trigger | Switch - 1NO, 1 NC | Opens the gates when pressed, closes gates when released | Located on flight stick |
| ARMED toggle | Switch, 2 pos, locking detent | Arms FRDS system to enable high voltage to motor, illuminate the ARMED indicator light | Status Indicator on Pilot Interface |
| OPEN/CLOSE toggle | Switch, 3 pos, momentary, center rest | Opens or closes door when toggled | System must be ARMED |
| Coverage Level +/− toggle | Switch, 3 pos, momentary, center rest | Increases or decreases coverage level when toggled | Sets the desired flow rate from the gate |
| Gallons to Dump +/− | Switch, 3 pos, momentary, center rest | Increases or decreases the gallons to dump when toggled | Sets the desired volume to drop |
| Foam Set/Inject | Switch, 3 pos, momentary, center rest | Sets foam injection value or initiates foam injection | Controls foam system |
| Datawheel | Push button, rotary encoder | Rotation scrolls through menu selections, push selects current item | Located on the Pilot Interface |
| Mark | Switch, momentary | Creates points of interest | For telemetry system only |
| Distress | Switch, momentary | Transmits a distress message | For telemetry system only |
| Menu | Switch, momentary | Enters/exits controller menus | |
| Home | Switch, momentary | Returns display to Home screen | |
| MSG | Switch, momentary | Receives text messages sent to the unit | For telemetry system only |

Figure 3:
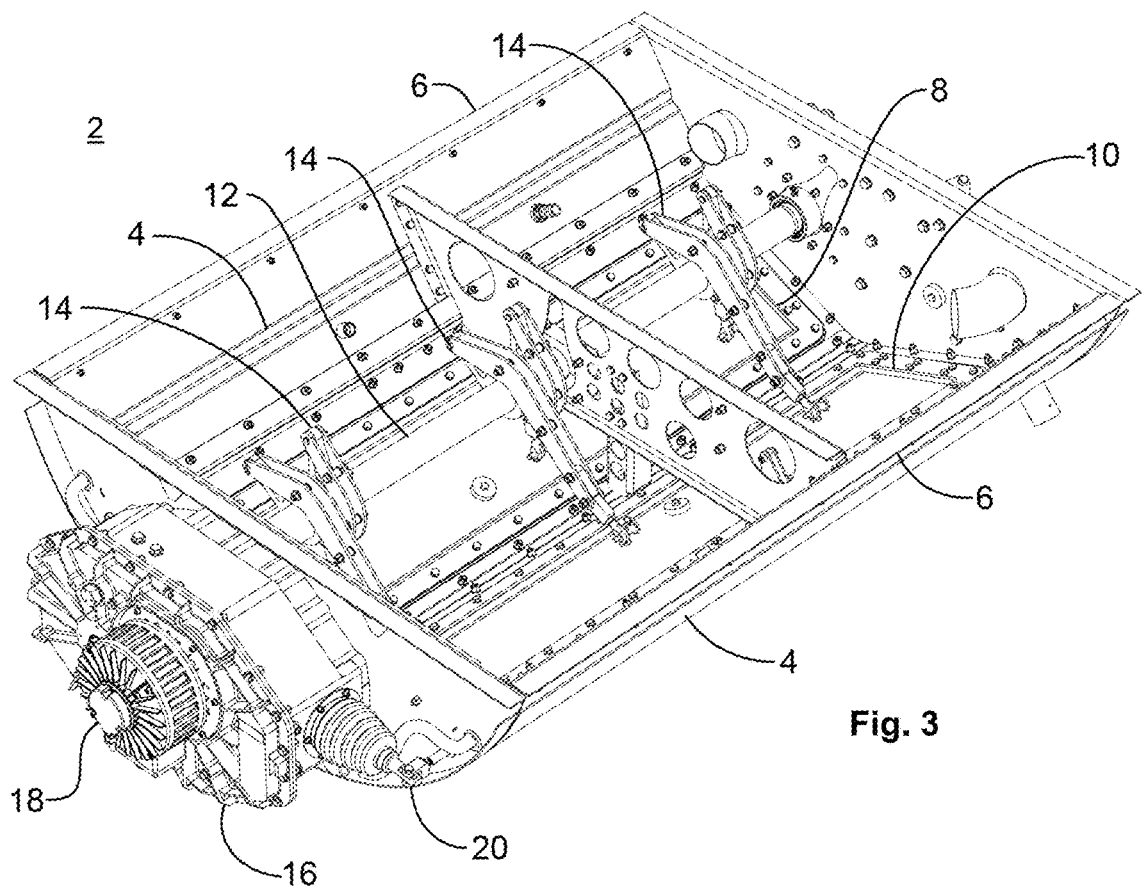
FIG. 3 is a perspective view drawing of a fire retardant gatebox according to an illustrative embodiment of the present invention.

During normal operation of the system, the following operating parameters exist:
  A. Circuit breakers for the system are engaged to distribute bus power from the aircraft to the gate control system
  B. The system microprocessors boot up and current system parameters are displayed on the Pilot Interface
  C. Coverage Level and Gallons to Dump are adjusted to the desired value by the pilot
  D. The pilot toggles the ARMED switch to arm the system
  E. The system is now in standby mode
  F. The pilot depresses the drop trigger on the flight stick to initiate a drop
    a. The system opens the doors to maintain the desired flow rate, once the desired volume has been released the doors close automatically
  G. Once the drop is complete, the pilot releases the drop trigger. The pilot may choose to release the trigger to close the doors prior to the release of the pre-selected volume
    a. When the doors are open in any mode, if the pilot releases the drop trigger the doors will close
  H. The system returns to standby mode and is ready for another delivery cycle Reference is directed to FIG. 3 and FIG. 4, which are drawings of a fire retardant gatebox 2 according to an illustrative embodiment of the present invention. The gatebox 2 is a riveted aluminum structure 4 that is mounted to the belly of the aircraft. The structure is primarily assembled from 6061-T6 aluminum sheet. The gatebox 2 attaches to the airframe (not shown) using a flange and bolt pattern 6 on the upper portion thereof. Front and rear fiberglass fairings (not shown) are attach between the gatebox 2 and belly of the airframe (not shown) to provide an aerodynamic profile. The Air Tractor AT-802F aircraft comprises forward and rear fiberglass hoppers (not shown) that have throats that exit at the belly of the aircraft to feed fire retardant into the gatebox 2.

The gatebox 2 includes a first and second gate opening 7, 9 that each has a corresponding gate 8, 10 that is hinged along one edge of the gate openings. A piano style hinge is appropriate, and an O-ring seal may be disposed between the gate openings and the gates to provide a water tight seal when the gates 8, 10 are in a closed position to engage the gate openings 7, 9.

A drive shaft 12 is rotatably supported within the gatebox 2 and aligned along the longitudinal axis of the aircraft in this embodiment. The drive shaft 12 is rotatable in both a gates-opening direction and a gates-closing direction, which will be more fully discussed hereinafter. Plural sets of crank arms 22, 24 and connecting links 14 are disposed along the length of the drive shaft 12 for opening and closing the gates 8, 10 by rotation of the drive shaft 12. Each set comprises a crank 22, 24, which are fixed along the length of the drive shaft 12, and a corresponding connecting link 26, 28 that are disposed between a distal end of the crank arms 22, 24 and corresponding gate 8, 10. In this embodiment, three crank arms and connecting links are provided for each gate. A minimum of one crank arm and connecting link is required for each gate. Thusly, rotation of the drive shaft 12 is converted to linear travel by the crank arm and connecting link arrangement to push the gates open in the gates-opening direction of rotation and pull the gates closed in the gates-closing direction.

Figure 4:
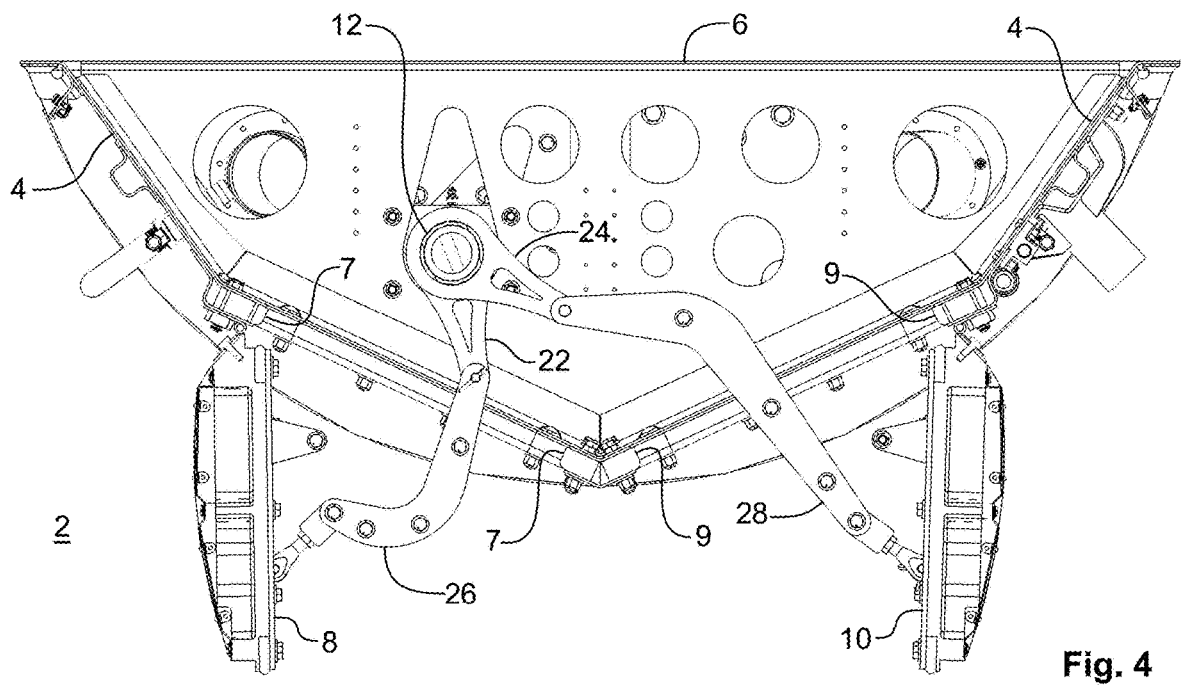
FIG. 4 is a section view drawing of a fire retardant gatebox according to an illustrative embodiment of the present invention.

Reference is directed to FIG. 4, which is a section view drawing of a fire retardant gatebox 2 according to an illustrative embodiment of the present invention. FIG. 4 corresponds with FIG. 3. In FIG. 4, the upper mounting flange 6 is defined by the gatebox 2 aluminum sheet 4 structure, with the first gate opening 7 and the second gate opening 9 formed through a lower portion thereof. A first gate 8 is hingedly connected along an edge of the first gate opening 7. The drive shaft 12 has a first crank arm 22 fixed thereto, which is in-turn coupled from its distal end to the first gate 8 by a first connecting link 26, as illustrated. Similarly, the second gate 10 is hingedly connected along an edge of the second gate opening 9, and the drive shaft 12 also has a second crank arm 24 fixed thereto, which is in-turn coupled from its distal end to the second gate 10 by a second connecting link 28, as illustrated. As noted above, in the illustrative embodiment, there are three sets of crank arms and connecting links for each gate. Thusly, it can be appreciated that rotation of the drive shaft 12 will simultaneously open and close both gates 8, 10, depending on whether it is rotated in the gates-opening or gates-closing directions.

Figure 5:
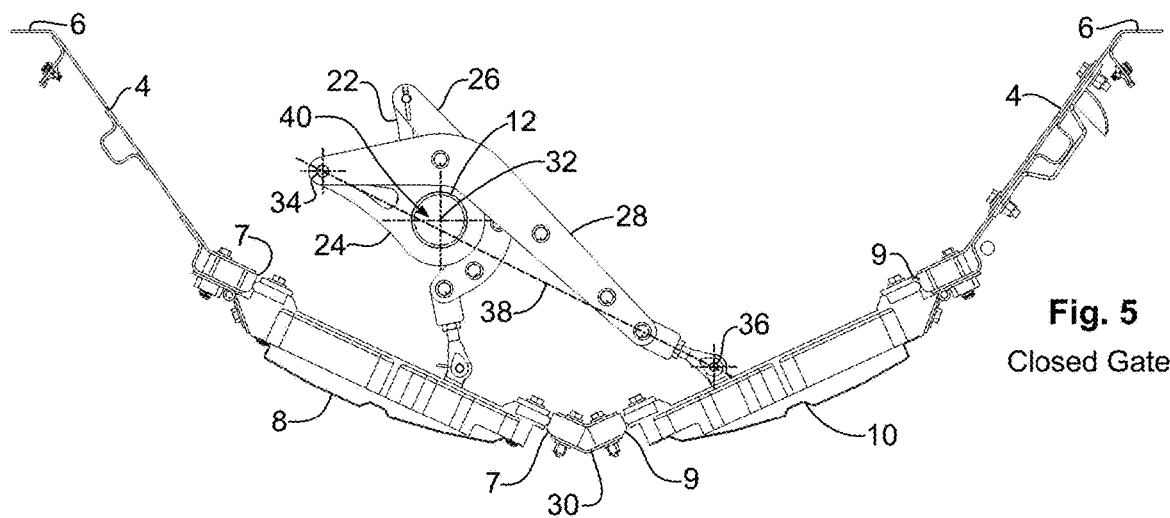
FIG. 5 is a section view drawing of a fire retardant dump gates and drive linkages according to an illustrative embodiment of the present invention.

Reference is directed to FIG. 5, which is a section view drawing of a fire retardant gatebox with drop gates and drive linkages according to an illustrative embodiment of the present invention. FIG. 5 corresponds with FIG. 4. In FIG. 5, the gates 8, 10 are shown in their fully closed position. The gate openings 7, 9 are separated by a portion of the gatebox structure 30, which is used to form a water tight seal while the gates 8, 10 are closed. O-rings or other elastomeric seals are appropriate for this application. Such seals can be applied to the gate openings 7, 9 or the gates 8, 10, or both. The drive shaft 12 can be seen above the gates 8, 10. The first gate 8 is connected to the drive shaft 12 by a first crank arm 22 and a first connecting link 26. Note that the connecting link 26 is has an arcuate shape to facilitate clearance for the drive shaft 12. The second gate 10 is connected to the drive shaft 12 by a second crank arm 24 and a second connecting link 28. Note that the connecting link 28 is has an arcuate shape to facilitate clearance for the drive shaft 12. Also note that the close clearance between the second connecting link 298 and the drive shaft 12 is such that rotation of the drive shaft 12 in the counter-clockwise direction would result in engagement between the connecting link 28 and the drive shaft, which would prevent over-rotation of the drive shaft in the gates-closing direction. This is by design.

Now consider the geometry of the connecting links and crank arms in FIG. 5, which are shown in the closed position with an over-center configuration. The second crank arm 24 has a pivot 34 at its distal end, which connects to the second connecting link 28, which in-turn connects to a pivot 36 attached to the second gate. The centerline 38 between the crank arm pivot 34 and the gate pivot 38 lies below the centerline of the drive shaft 12. As such, a downward load of fire retardant on the second gate will induce a rotation on the drive shaft 12 in the gates-closing direction (counter-clockwise in this view). Thusly, the drive shaft needn't hold the gate closed because the second connecting link 28 will engage the drive shaft 12 to prevent over-rotation in the gates closing direction. Other structure and stops could also be provided to prevent such over rotation. This is an important feature of the present embodiment because it provides that the motor and transmission do not have to be energized or locked to hold the gates closes. It is a passive mechanical arrangement that holds the gates closed. Of course, the first crank arm 22 and first connecting link 26 may provide the same over-center geometry.

Figure 6:
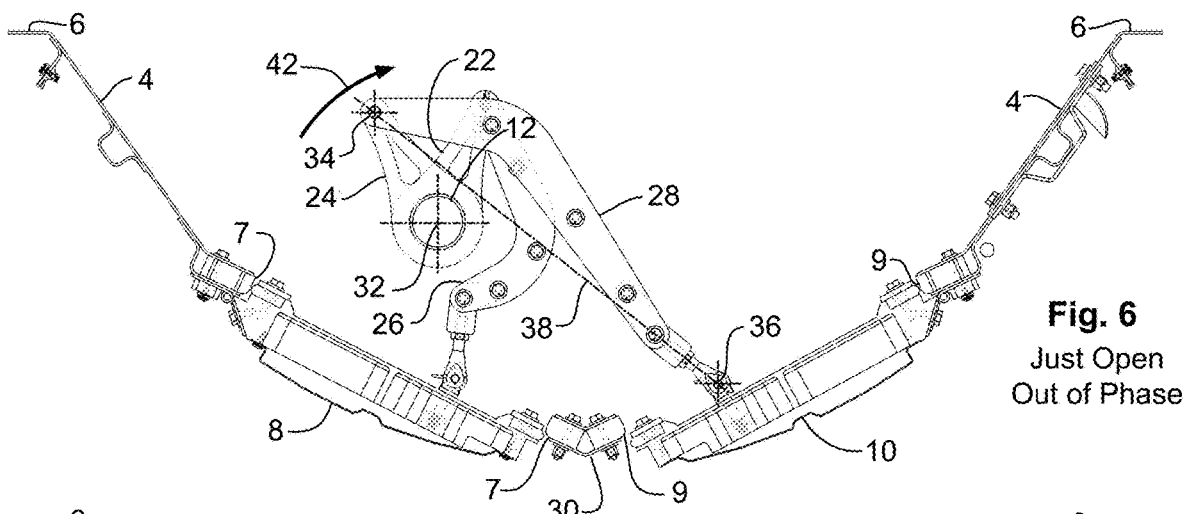
FIG. 6 is a section view drawing of a fire retardant dump gates and drive linkages according to an illustrative embodiment of the present invention.

Reference is directed to FIG. 6, which is a section view drawing of a fire retardant gatebox and drive linkages according to an illustrative embodiment of the present invention. FIG. 6 corresponds with FIG. 5. FIG. 6 illustrates two features of the present design. First, the change in linkage geometry away from the over-center condition, and second the implementation of out of phase gate linkages. In this Figure, the drive shaft 12 has been rotated 42 in the gates-opening direction. As this happens, the centerline 38 between the crank arm pivot 34 and gate pivot 36 has moved above the centerline 32 of the drive shaft 12, and away from the over-center condition. Therefore, the weight of the fire retardant on the gates 8, 10 will induce rotation of the drive shaft in the gates-opening direction. This is important with respect to the emergency dump feature (described elsewhere herein) because it enables manual opening of the gates with minimal force and distance of movement. All that need occur is to disconnected the motor drive and transmission from the drive shaft 12, and then apply just enough rotation in the gates-opening direction to move past the over-center condition. As soon as that occurs, the weight of the fire retardant will cause the gates to fall open and immediately drop the entire load of fore retardant.

The other feature illustrated in FIG. 6 is the out of phase link arrangement. The rotational forces applied to the drive shaft 12 are provided by the motor and transmission (not shown) and vary along the distance of rotational travel of the drive shaft 12. The highest forces occur as the linkages pass through the over-center position, and as the seals around the gate openings are engaged. Since there are two gates, the forces occur in two parts, and the total force is approximately twice that of a single gate operating force. By adjusting the position of the crank arms 24, 22, and/or the lengths of the crank arms and connecting links 26, 28, the designer can adjust these force peaks to be out of phase with one another, and therefore spread them out over the distance of rotational travel of the drive shaft 12. This has the effect of reducing the peak torque required from the motor and transmission. In FIG. 6, it can bee seen that the second gate 10 has opening slightly more than the first gate 8, and this illustrates the out of phase linkage arrangement.

Figure 7:
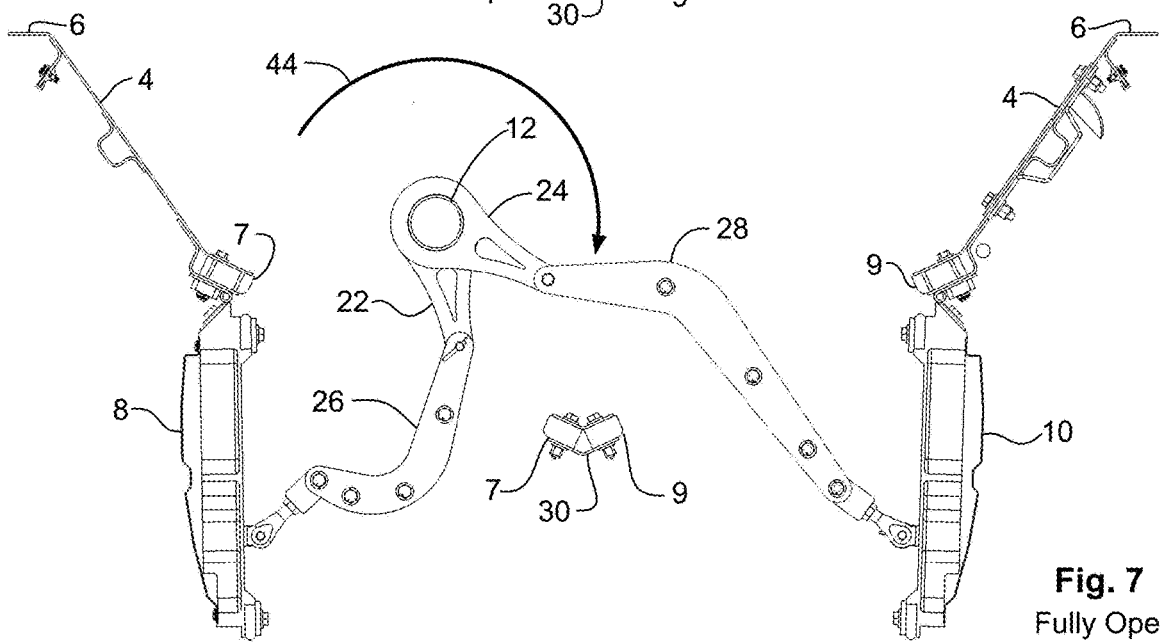
FIG. 7 is a section view drawing of a fire retardant dump gates and drive linkages according to an illustrative embodiment of the present invention.

Reference is directed to FIG. 7, which is a section view drawing of a fire retardant dump gates and drive linkages according to an illustrative embodiment of the present invention. FIG. 7 corresponds with FIGS. 5 and 6. In FIG. 7, the weight of the fire retardant (not shown) has pushed the gates 8, 10 fully open and the fire retardant has been completely dropped by the gates. The falling action of the gates 8, 10 has been coupled through the connecting links 26, 28 and the crank arms 22, 24 and caused the drive shaft 12 to rotate fully 44 in the gates-open direction. The ability of the gates to fall open depends upon disconnection of the drive shaft 12 from the motor and transmission (not shown). If such a disconnect is not implemented, then the movement of the gates 8, 10 remains under control of the system, by the motor and transmission.

Figure 8:
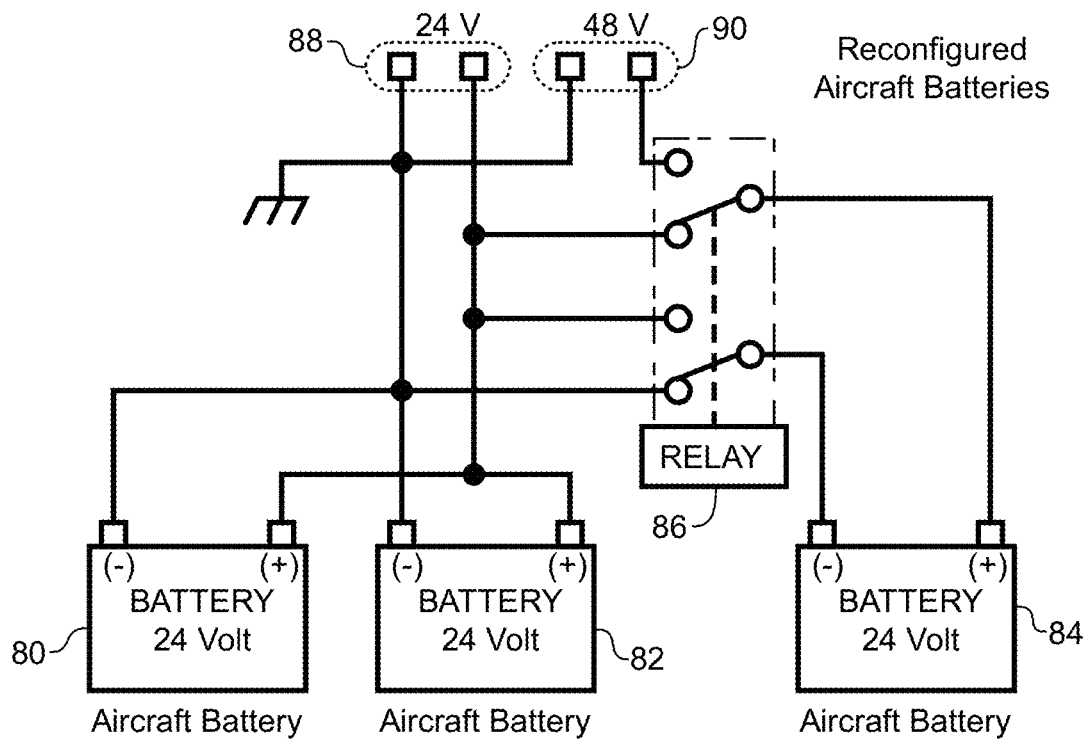
FIG. 8 is a diagram of a power supply according to an illustrative embodiment of the present invention.

Reference is directed to FIG. 8, which is a schematic diagram of a power supply according to an illustrative embodiment of the present invention. As was discussed hereinbefore, modern aircraft commonly provide a DC power bus that provides 24-volt (nominal) power for accessories. The present disclosure contemplates the use of 24-volt motors and circuitry that can be directly coupled to such a power bus. However, the use of a higher voltage power supply offers certain advantages, particularly with respect to the available power and torque in an electric motor of a given frame size. Higher voltage also enable designers to user lighter gauge wiring for a given motor rating, since the current is halved by a doubling of the voltage. FIG. 8 illustrates one technique for doubling the power supply voltage by rearranging the interconnection amongst plural batteries provided with the aircraft.

FIG. 8 illustrates an aircraft that originally provides three 24-volt batteries 80, 82, 84, which are originally connected in parallel to drive the aircraft power bus, at terminals 88. Under the teachings of the present disclosure, one of the batteries 84 is selected to be rewired, and interconnected with a suitable DPDT relay 86. In its unpowered state, the relay 86 couples the selected battery 84 in parallel with the non-selected batteries 80, 82. As such, the system operates as originally provided by the aircraft manufacture, in that all three batteries are in parallel and are coupled to provide 24-volts to the aircraft bus terminals 88. The aforementioned gate controller (not shown) is coupled to drive the relay 86 into a powered state when the systems requires 48-volts for operation. This would occur at any time the gate controller operates the drive motor. When this occurs, the relay 86 contacts switch states and the selected battery 84 is temporarily wired in series with the two unselected batteries 80, 82, and the 48-volts that that arrangement provides is delivered to the motor power terminal 90. When the motor operations are complete, the relay 86 is deenergized to return to the 24-volt operating mode.

Figure 9:
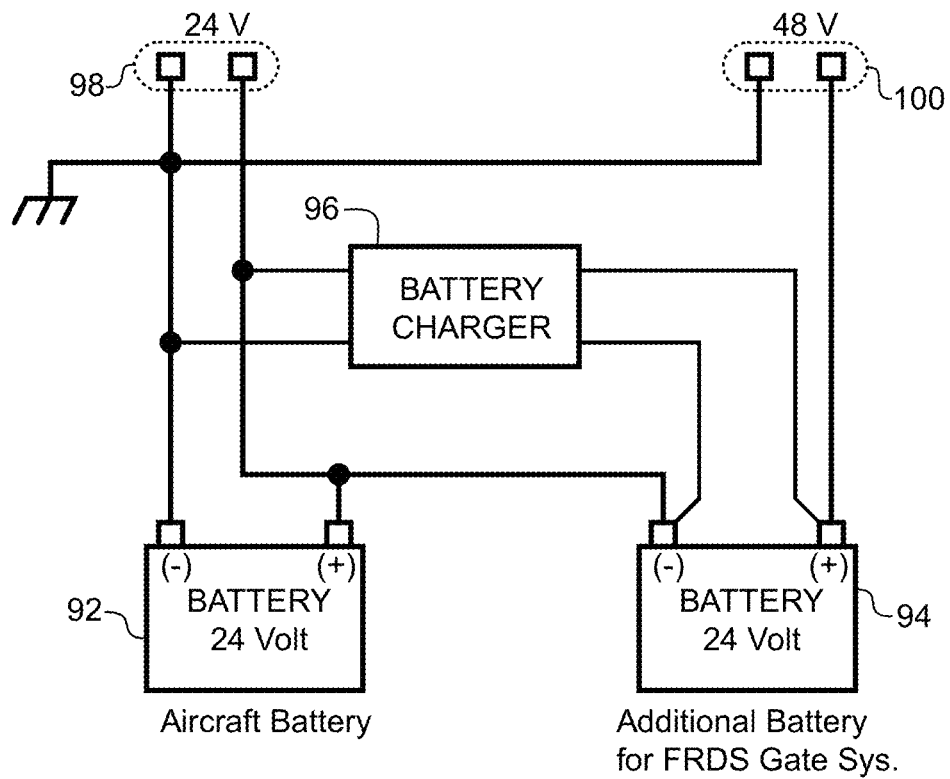
FIG. 9 is a diagram of a power supply according to an illustrative embodiment of the present invention.

Reference is directed to FIG. 9, which is a diagram of a power supply according to an illustrative embodiment of the present invention. FIG. 9 illustrates an alternative circuit design for providing 48-volts to the motor and motor controller (not shown) of the present disclosure's gatebox system. In this embodiment, an additional battery 94 is added to the existing aircraft power system batteries 92. Note that only a single aircraft battery 92 is illustrated in the circuit to simplify the schematic diagram. In actuality, there would be plural batteries at the connection of battery 92. The aircraft batteries 92 deliver 24-volts to the aircraft power bus at terminal 98. The additional battery 94 is wired in series with the aircraft power bus to provide 48-volts to the motor power supply terminals 48. In order to maintain a charge on the additional battery a battery charger 96 is provided, which draws power from the aircraft bus and charges the additional battery 94.

During normal operation, the gatebox system of the present disclosure is operated by the gate controller utilizing an electric motor to operate the gatebox gates, and the system is designed to be reliable and trouble free. However, as in all things aviation related, redundancy and manual alternatives are needed to be certain the pilot can safely return the aircraft to ground, or avoid a dangerous aeronautical situation. To that end, the present disclosure provides an emergency drop system, which is also referred to as an emergency dump or "E-Dump" system. This system must be operable without external power of any kind, and must be operable by the pilot from the cockpit. Accordingly, the present disclosure teaches an independent, fully mechanical system configured so that the gates can be opened in the event the gatebox system is inoperative. When power is off to the gatebox system, a mechanical over-center latch arrangement is used to keep the gatebox gates closed. This latch system allows for a fire retardant load to be retained in the hoppers indefinitely without any action from the gatebox system, as was described above.

In order to open the gates using the emergency drop system, the pilot pushes an emergency drop handle forward in the cockpit causing a series of linkages to open the gatebox gates past the over-center latched position. The emergency drop system will function even if electrical power to the system is lost. A series of limit switches are wired into the system to cut control power to the gatebox system in the case where electrical power still exists. In one embodiment, the emergency drop handle is connected to a series of bell cranks and linkages as well as two series connected electronic limit switches. When the lever is pushed forward, the limit switches are opened. This provides a signal to the gate controller that an emergency drop has been initiated. The gate controller then inhibits any commands to the electric motor. The lever also enacts a mechanical series of linkages, which pull a release fork inside the transmission that is mounted to the front of the gatebox so as to decouple the electric motor's output shaft from the gate drive shaft. This action removes the motor from the mechanical system. Another part of the emergency drop system linkage pulls a crank arm located on the back side of the gatebox. This rotates the gatebox's drive shaft so that the gate linkages are pulled back over-center. Once pulled into the un-latched position, the gates rotate to the fully open position due to the weight of the fire retardant in the aircraft's hoppers, which instantly empties the aircraft fire retardant hoppers.

Figure 10:
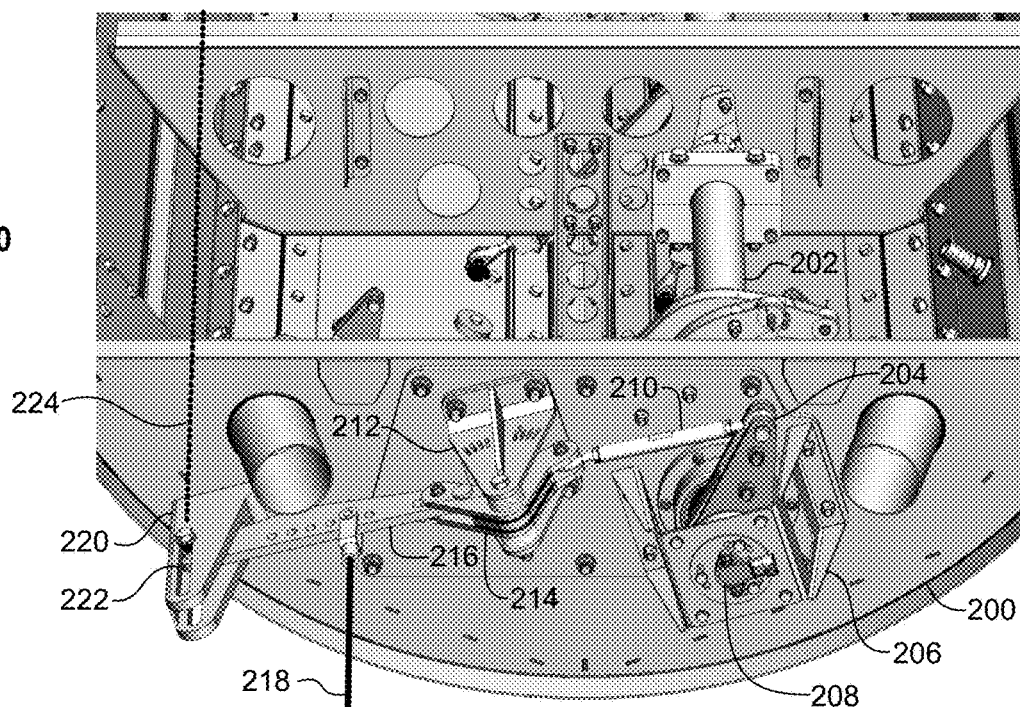
FIG. 10 is a perspective view drawing of an emergency dump linkage according to an illustrative embodiment of the present invention.

Reference is directed to FIG. 10, which is a perspective view drawing of an emergency drop system linkage according to an illustrative embodiment of the present invention. The end wall 200 of the gatebox serves as the mounting location for the mechanical components of the emergency dump system. External connections to this system include the pilot pull rod 218, which is connected to an operating handle in the cockpit, and, the clutch rod 224, which connects to a clutch located in the transmission (not shown) at the opposite end of the gatebox. The clutch rod 224 is illustrated in broken line because it is located behind the gatebox. The drive shaft 202 extends through the end wall 200, and is connected to a crank arm 204 supported within a drive shaft mount 206. Not that the drive shaft position sensor 208 is located on the mount 206, and communicates the drive shaft position to the gate controller (not shown). A crank rod 210 is linked between the crank arm 204 and a first end of a bell crank 214, which is rotatably supported in a suitable mount 212. A dump link 216 is connected to the opposite end of the bell crank 214, and is connected to the clutch rod 224 at its opposite end. The connection between the dump link 216 and the clutch rod 224 is guided and limited in range of movement by a slot 222 in the clutch rod bracket 220. The pilot pull rod 218 is connected to the dump link 216 along its length.

Figure 11:
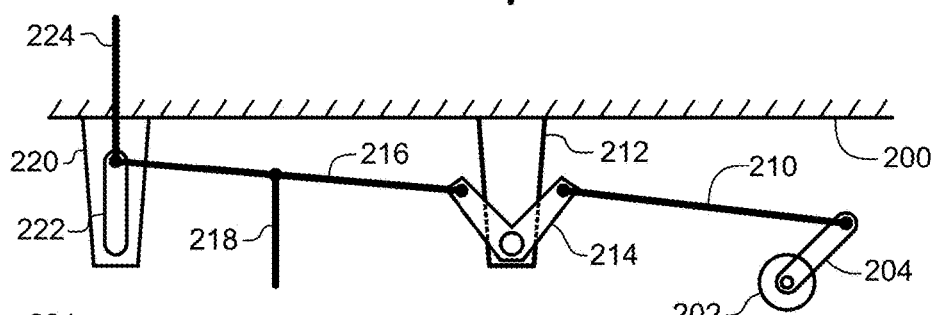
FIG. 11 is a diagram of an emergency drop linkage according to an illustrative embodiment of the present invention.
Figure 12:
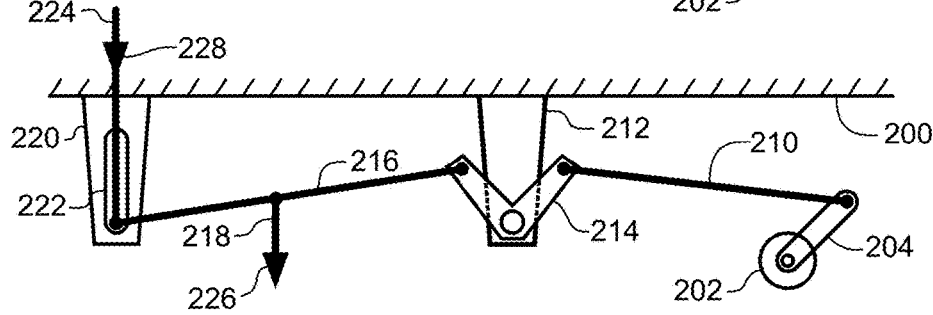
FIG. 12 is a diagram of an emergency drop linkage according to an illustrative embodiment of the present invention.
Figure 13:
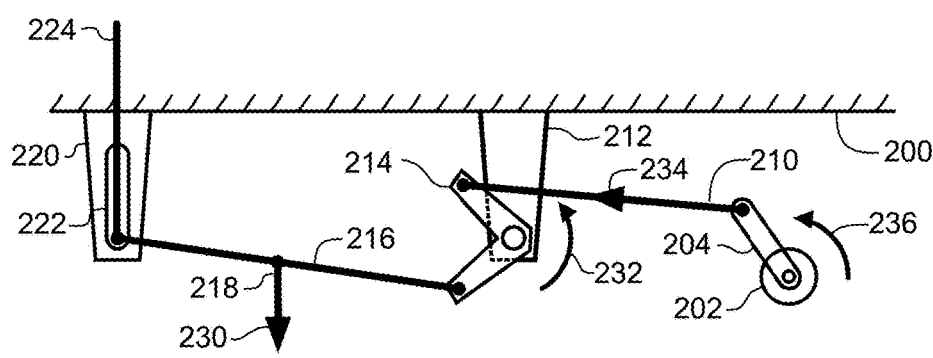
FIG. 13 is a diagram of an emergency drop linkage according to an illustrative embodiment of the present invention.

Reference is directed to FIGS. 11, 12, and 13, which are operating diagrams of the emergency dump linkage system of FIG. 10, and according to an illustrative embodiment of the present invention. The emergency dump system functions through three states, corresponding to FIGS. 11, 12, and 13, respectively. FIG. 11 shows the system in the normal state where the gates (not shown) are closed, the clutch (not shown) is engaged, and the drive shaft 202 has been rotated in the gates-closing direction such that the aforementioned over-center condition holds the gates closed. Note that in these figures, the orientation of the drive shaft 202 and crank arm 204 have been rotated ninety degrees with respect to the end wall 200 of the gatebox for visual clarity. FIG. 12 shows the emergency dump linkage in the clutch-released state, and FIG. 13 shows the linkage in the gates-open state.

In FIG. 11, the crank arm 204 is located to the right, which is the over-center position, whereby the gates (not shown) hold themselves closed. The bell crank 214 is also rotated to the rights, as shown, by virtue of the crank rod 210 linkage. The clutch rod 224 is forward, which is the clutch-engaged position. The pilot pull rod 218 is also in the forward position. Note that "forward" means to toward the front of the aircraft, which is up in these drawing figures. In FIG. 12, the pilot has pulled 226 the pilot pull rod 218 partially rearward to activate the second state of the linkage system. The pilot pull rod 218 pulls 226 the dump link 216 rearward, which pulls 228 the clutch rod 224 rearward, thereby disengaging the clutch (not shown). The movement 228 of the clutch rod 224 is limited by the slot 222 in the clutch rod bracket 220. Once this limit of movement is reached, the dump link 216 begins rotating the bell crank 214 to the left, transitioning to the open state of FIG. 13.

In FIG. 13, the pilot pull rod 218 has pulled 230 fully rearward, which rotates 232 the bell crank 214 to the left. This action causes the crank rod 210 to pull 234 the crank arm 204, thereby rotating 236 it to the left, and past the aforementioned over-center condition. The weight of the fire retardant (not shown) on the gates (not shown) promptly forces the gates open, and dumping the fire retardant from the hoppers.

Figure 14:
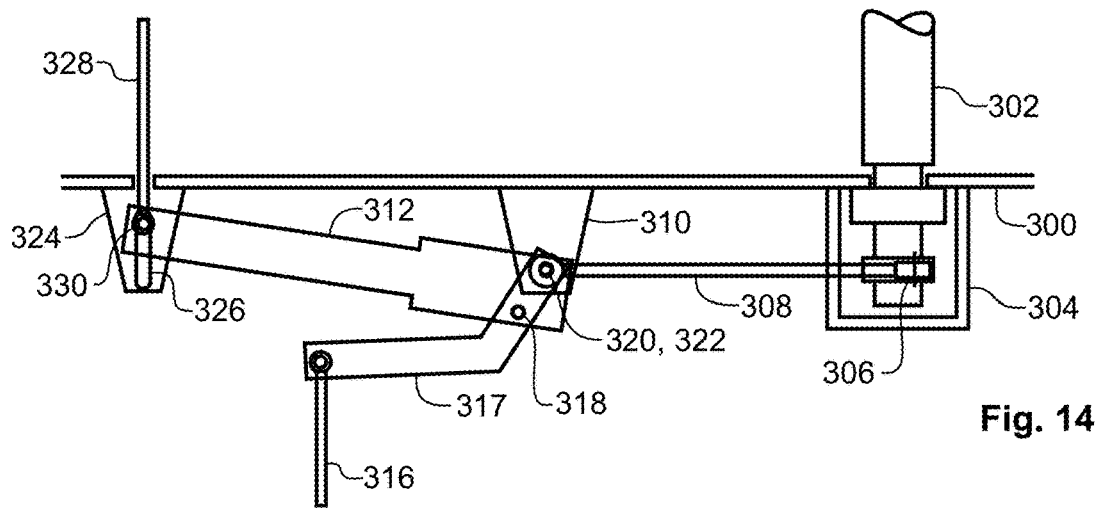
FIG. 14 is a diagram of an emergency drop linkage according to an illustrative embodiment of the present invention.
Figure 15:
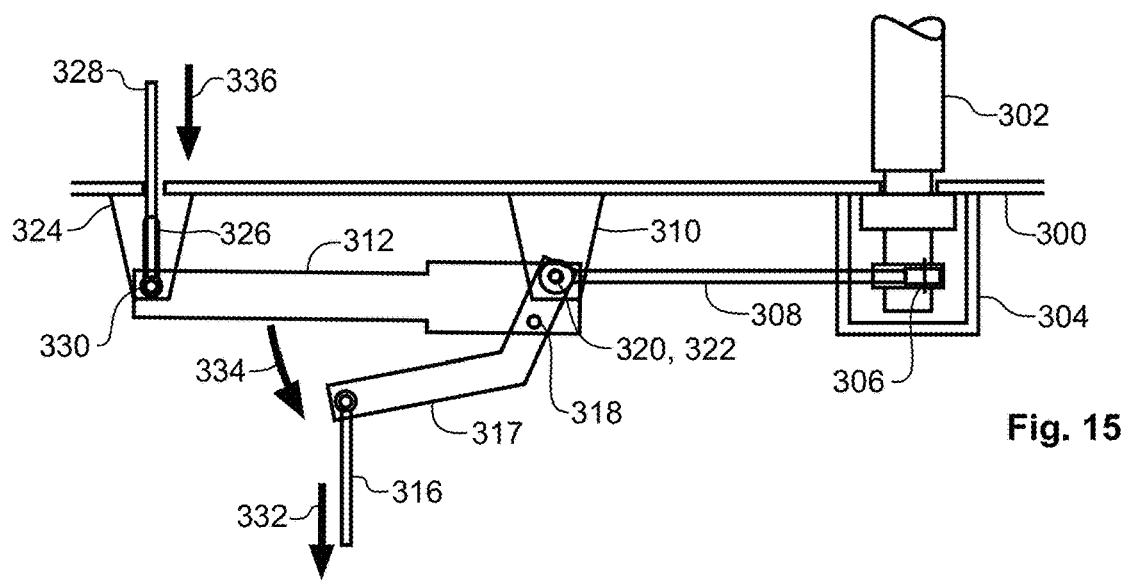
FIG. 15 is a diagram of an emergency drop linkage according to an illustrative embodiment of the present invention.
Figure 16:
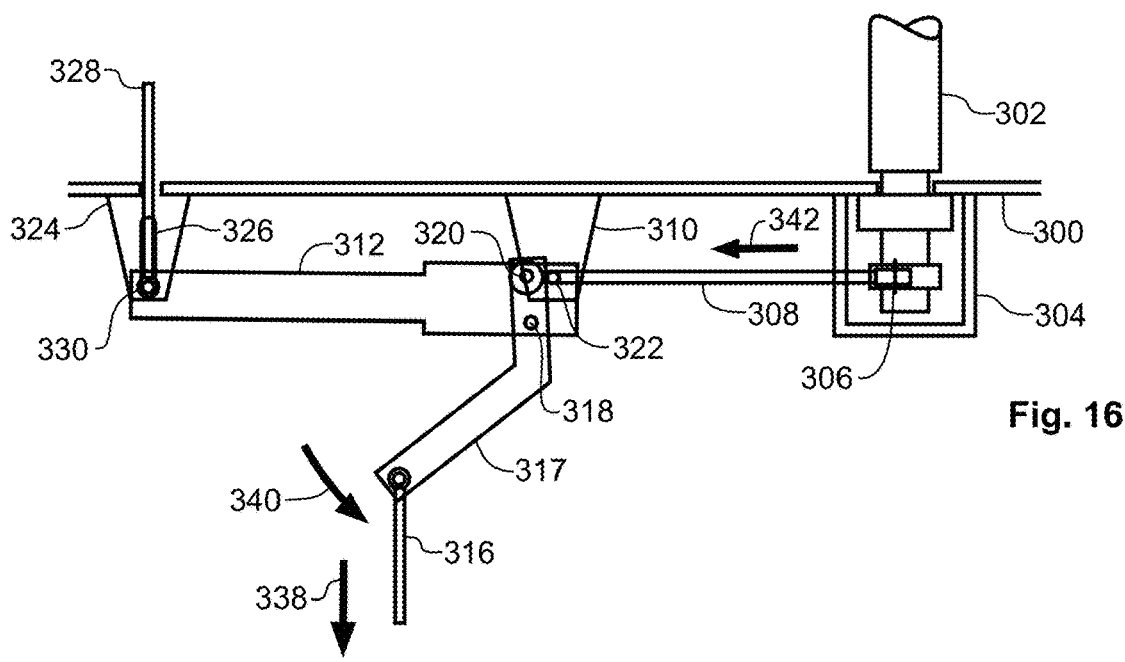
FIG. 16 is a diagram of an emergency drop linkage according to an illustrative embodiment of the present invention.

Reference is directed to FIGS. 14, 15, and 16, which are emergency dump linkage diagrams according to an illustrative embodiment of the present invention. This emergency dump system functions through three states, corresponding to FIGS. 14, 15, and 16, respectively. FIG. 14 shows the system in the normal state where the gates (not shown) are closed, the clutch (not shown) is engaged, and the drive shaft 302 has been rotated in the gates-closing direction such that the aforementioned over-center condition holds the gates closed. FIG. 15 shows the emergency dump linkage in the clutch-released state, and FIG. 16 shows the linkage in the gates-open state.

The linkage arrangement in FIGS. 14, 15, and 16 are attached to the rear bulkhead 300 of the gatebox. The drive shaft 302 is supported on a drive shaft mount 304, and has a crank arm 306 attached to its end, which enables rotation of the drive shaft 302 by the various linkages. This embodiment comprises two levers that enable operation, and these include the crank lever 317 and the clutch lever 312. The clutch lever 312 pivots about a clutch lever pivot 322 on a clutch lever mount 310. The crank lever 317 pivots about a crank lever pivot 318 that is connected to the clutch lever 312, as illustrated. A crank rod 308 is connected to a distal end of the crank arm 306 and to a crank rod pivot 320 located on the clutch lever 312, as illustrated. Note that the crank rod pivot 320 and the clutch lever pivot 322 are aligned, one above the other, but not connected, in the aforementioned first and second states. A pilot pull rod is connected to a distal end of the crank lever 317. A clutch rod is connected 330 to a distal end of the clutch lever 312, and its movement is limited by a slot 326 in a clutch rod mount 324, as illustrated.

In FIG. 14, the pilot pull rod 316 is in the forward position (toward the front of the aircraft, and up in the drawing figure). The clutch rod 328 is also in the forward position, where the clutch (not shown) is engaged. The crank arm 306 is to the right, and the drive shaft 302 is in the over-center position, holding the gates (not shown) closed as discussed hereinbefore. In FIG. 15, the pilot has pulled 332 the pilot pull rod 316 rearward. This action rotates 334 the crank lever 317 and the clutch lever 312 downward (counter-clockwise in the figures). Rotation of the clutch lever 312 pulls 336 the clutch rod 328 rearward, disengaging the clutch (not shown). The extent of this movement 336 is limited by the clutch slot 326 in the clutch rod mount 324. Once the limit of the clutch slot is reached, then further rearward movement 338 (FIG. 16) of the pilot pull rod 317 results in rotation 340 of the crank lever 317.

In FIG. 16, the pilot pull rod 316 has been pulled 338 to its rearward extent, and the crank lever 317 has been rotated 340 to its full extent. This action causes the crank lever 317 to rotate about the crank lever pivot 318, and pull the crank rod 308, to thereby rotate the drive shaft 302 past the over-center condition. This action causes the gates (not shown) to drop open, as discussed hereinbefore. It is noteworthy to consider the utility of having the clutch lever pivot 322 and the crank arm connection point 320 aligned with one another while the crank arm 308 is full to the right. With this, pulling (322 in FIG. 15) the pilot pull rod 316 and rotating 334 the crank lever produces no force on the crank rod 308. This allows the full effort of the pilot's action to first disengage the clutch by rotating the clutch lever 312 first, and not beginning rotation of the crank lever 317 until the clutch rod 328 has engaged the rearward end of the slot 326. After that occurs, then all of the pilot's pull force is directed to pulling the crank arm 306 and drive shaft 302 back over-center.

Figure 17:
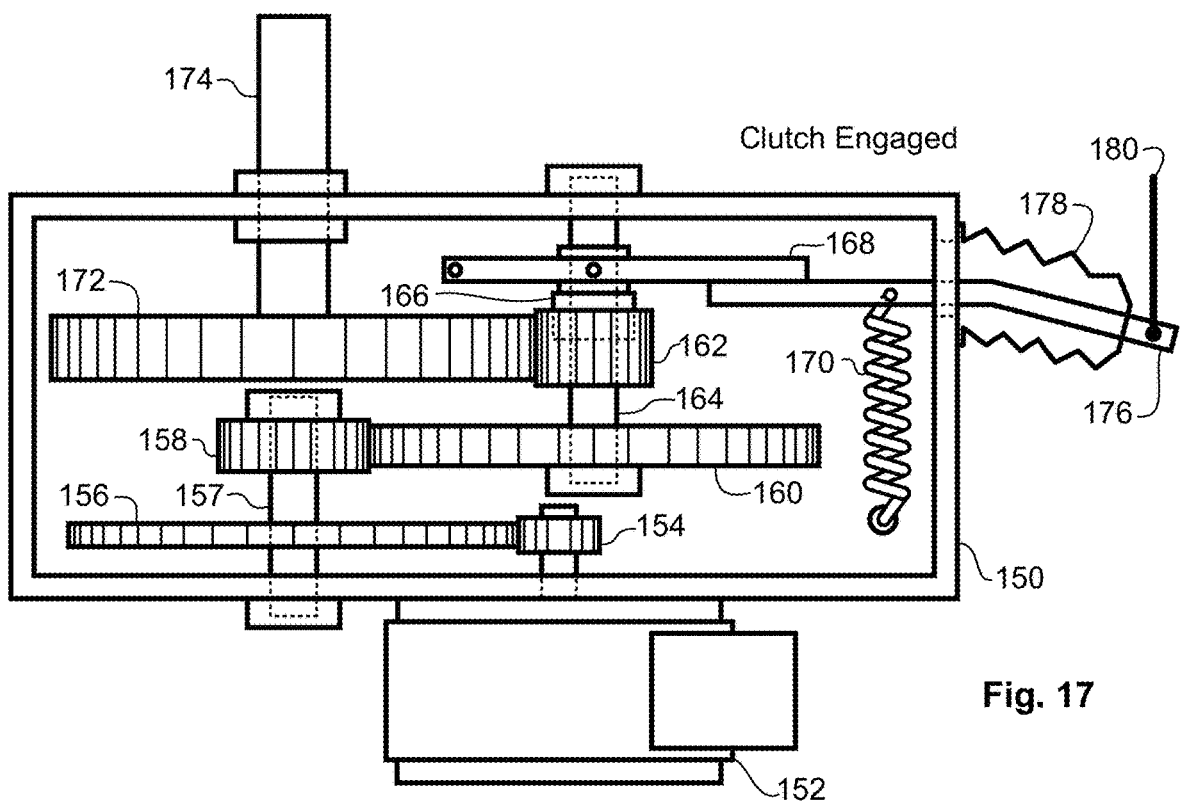
FIG. 17 is a section view drawing of a gear reduction transmission with clutch according to an illustrative embodiment of the present invention.
Figure 18:
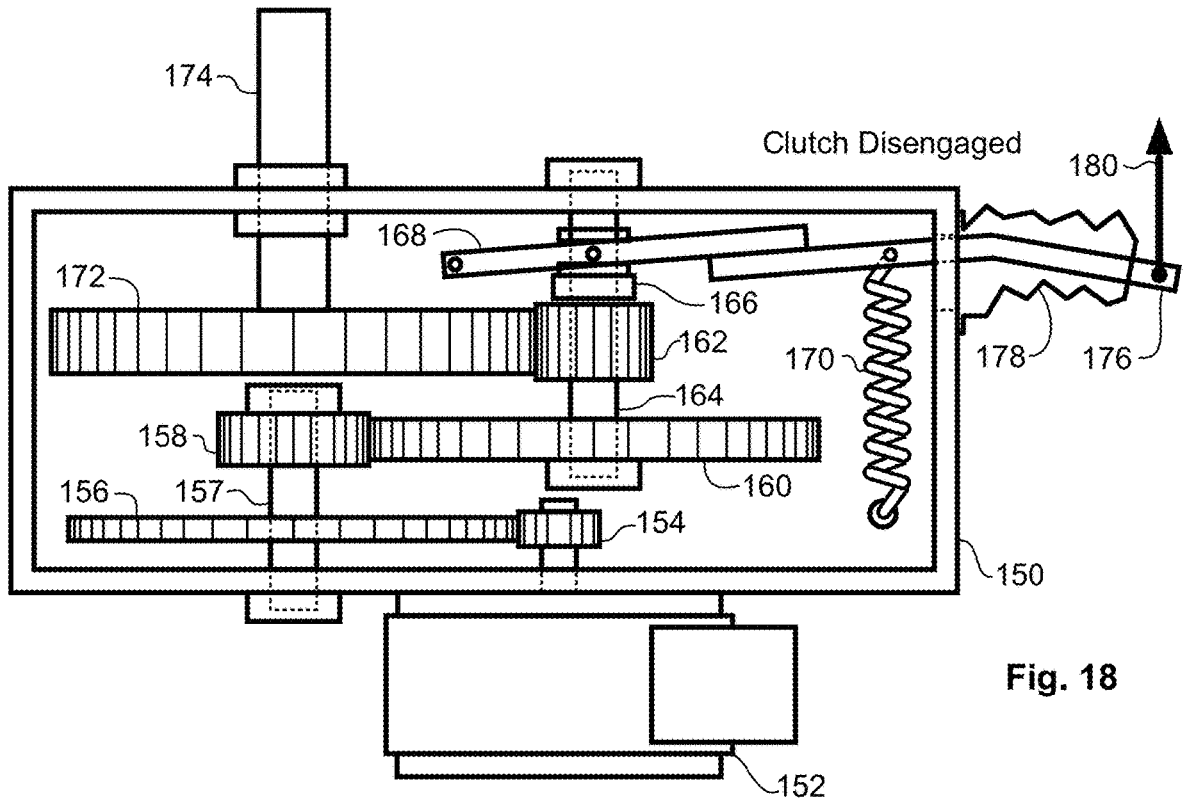
FIG. 18 is a section view drawing of a gear reduction transmission with clutch according to an illustrative embodiment of the present invention.

Reference is directed to FIGS. 17 and 18, which are a section view drawings of a gear reduction transmission with clutch according to an illustrative embodiment of the present invention. This device corresponds to item 16 in FIG. 3. FIG. 17 illustrated the transmission with the clutch 166, 162 engaged, and FIG. 17 with the clutch 166, 162 disengaged. The transmission comprises a housing 150, which encloses and supports a range of shafts, gears and bearings. The servo-motor 152 is mounted to the exterior of the housing 150, and presents a drive gear 154 within the housing 150. A first gear reduction is achieved by meshing the drive gear 154 with a first driven gear 156. This force is applied through shaft 157 to the next gear reduction set of gears 158 and 160. This force is coupled, in turn, to shaft 164. Shaft 164 is splined to a clutch cog 166, which is shiftable to either engage the interior of clutch gear 162, or allows clutch gear 162 to free wheel. In either case, clutch gear 162 meshes with output gear 172, which is fixed to the output shaft 174. The output shaft 174 is attached to the aforementioned drive shaft (not shown) in the gatebox (not shown). In other illustrative embodiments, the clutch arrangement 162, 164, 166 is implemented in alternative configurations. For example, the clutch function can be implemented using an off-the-shelf gear box as the transmission, and then employ a similar fork arrangement to engage and disengage a mating set of splines, or hardened pin and dogs that engage one anther. The functional aspect of this and other arrangements is to mechanically disengage the gearbox and motor from the drive shaft 174, including coupling the clutch operation to the aforementioned emergency release system, as will be appreciated by those skilled in the art.

Operation of the clutch is accomplished by sliding the clutch cog 166 along its splined connection to shaft 164 to either engage or disengage clutch gear 162. This is accomplished by moving shift fork 168 by applying a pulling force 180 at the distal end of shift rod 176. This is accomplished by the aforementioned clutch rod in the emergency dump system. A spring 170 is provided within the transmission housing 150 to return the clutch 162, 166 to the engaged condition. A weather seal boot 178 is provided about the shift rod 176.

Referring back to FIGS. 3, 4, 5, 6, and 7, it is noted that a single drive shaft 12 employed pairs of crank arms 22, 24 and connecting links 26, 28 to drive the pair of gates 8, 10, in the opening and closing directions. That drive shaft 12 was driven through a transmission 16 by an electric motor 18. In an alternative embodiment now presented, a pair of drive shafts may be employed. The two shafts are mechanically coupled together using a shaft synchronizer, which may employ one of serval designs, as will be more fully discussed hereinafter. The two shafts may be driven in a common direction of rotation ("common rotation") or may be driven in opposite directions of rotating ("counter-rotation"), with cranks arms and connecting links that are arranged to manage and synchronize gate movement in both the gates-opening and gates-closing directions. Note that "synchronization" does not necessarily mean the gates move in identical or identically symmetrical fashion. Rather, the movement of the gates is synchronized to be repeatable, and may employ non-symmetrical movement to facilitate fire retardant flow rates, driving force requirements, emergency release operation, as well as other considerations.

Figure 19:
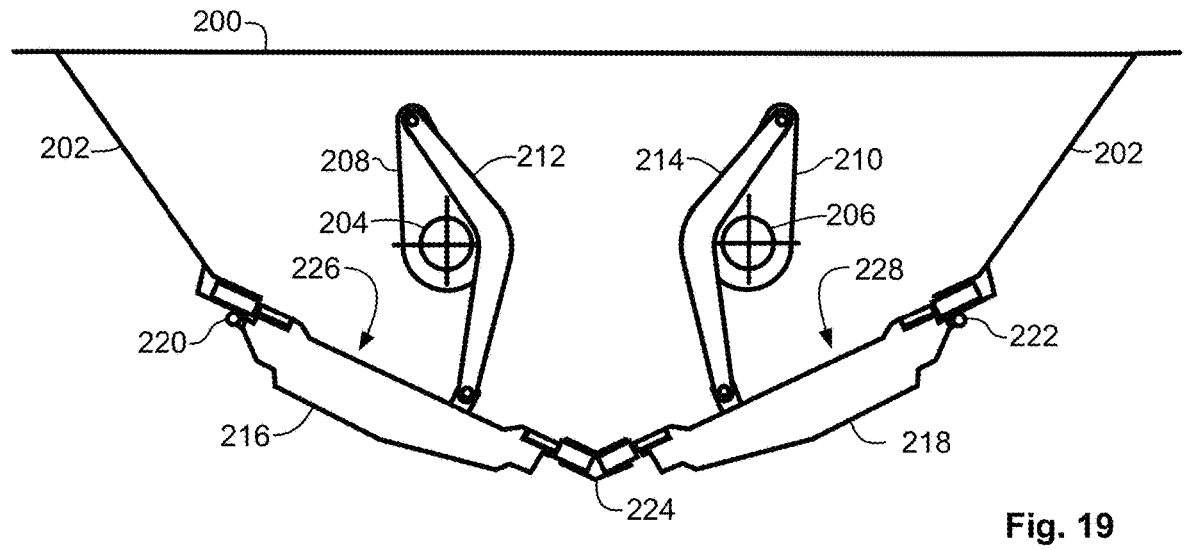
FIG. 19 is a section view drawing of a dual shaft gatebox assembly with the gates closed according to an illustrative embodiment of the present invention.

Reference is directed to FIG. 19, which is a section view drawing of a dual shaft gatebox 202 assembly with the gates 216, 218 in the closed position, and according to an illustrative embodiment of the present invention. The gate box 202 has an attachment flange 200 for mating with the aircraft fluid hopper (not shown) at its upper portion. A pair of gates 216, 218 are hinged 220, 222 along corresponding openings 226, 228 in the gate box 202, as illustrated. The openings 226, 228 are separated by a center portion 224, which serves as a seal point around a portion of the perimeter of openings 226, 228. There are two drive shafts 204, 206 arranged in parallel in the gate box 202, and generally disposed above their respective gates 216, 218. The two drive shafts 226, 228 have corresponding sets of crank arms 208, 210 connected to corresponding connecting links 212, 214, which are arranged so that rotation of the drive shafts 204, 206 urges the gates 216, 218 in respective gates-opening and gates-closing directions.

Figure 20:
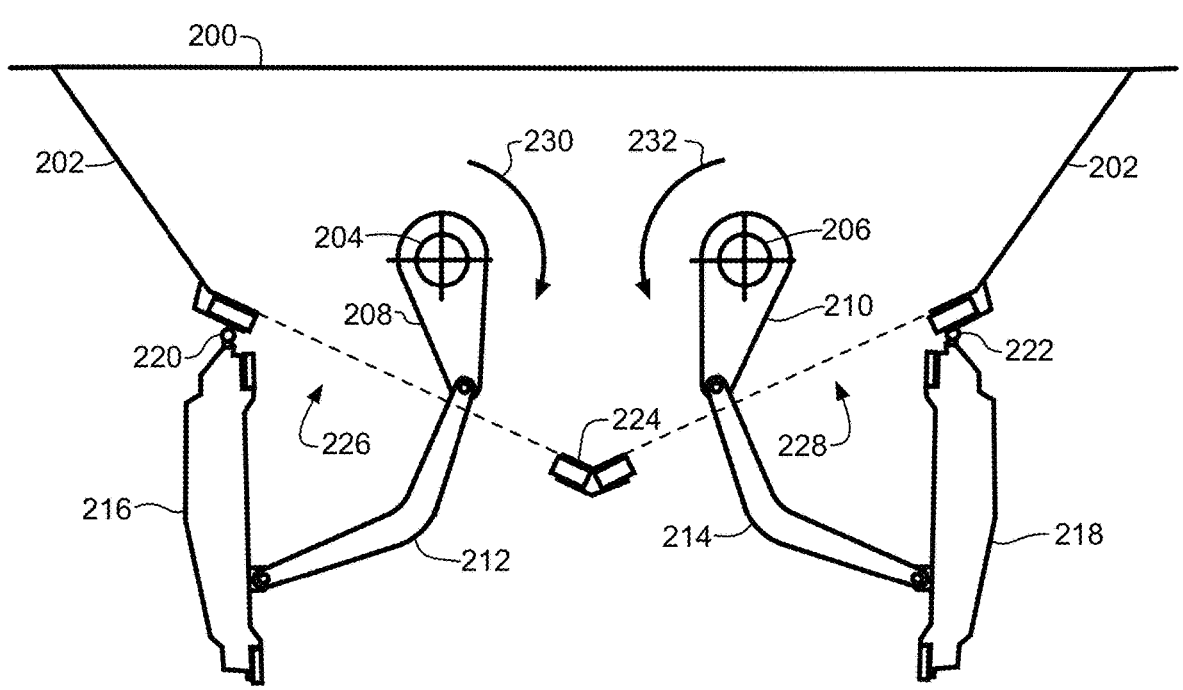
FIG. 20 is a section view drawing of a dual shaft gatebox assembly with the gates open according to an illustrative embodiment of the present invention.

Reference is directed to FIG. 20, which is a section view drawing of a dual shaft gatebox assembly 202 with the gates 216, 218 open according to an illustrative embodiment of the present invention. FIG. 20 corresponds with FIG. 19, but in FIG. 20, the drives shafts 204, 206 have been rotated 230, 232 in the gates-opening direction so as to open the gates 216, 218. As such, the gates 216, 218 have moved away from the center portion 224, and any fire retardant (not shown) in the system will have been dispensed. Note that the drive shafts 204, 206 are rotated 230, 232 in counter-rotation directions. The crank arms 208, 210 have moved in a downward direction, causing the crank arms 212, 214 to drive the gates 216, 218 open. Reversing the rotation would close the gates. Note that with the counter rotation of shafts 204, 206, the components can be symmetrical about a vertical centerline, which somewhat simplifies the design arrangement and mechanical calculations, as will be appreciated by those skilled in the art.

It should be noted that the specific geometry of the drive shafts 204, 206, the crank arms 208, 210, and the first and second connecting links 212, 214 provides a wide range of opportunities to the system designer. The individual drive shafts may synchronized to operate in the same or opposing directions of rotation, and may be positioned and spaced apart to satisfy system requirements and physical limitations. The crank arms can be positioned at any angle with respect to the drive shaft orientation, and may extend to any suitable distance from the drive shaft centerlines. The connecting links may be routed between the two drives shafts, as illustrated in FIGS. 19 and 20, or may be routed about the outboard sides of the drive shafts. Furthermore, the amount of angular rotation required to move the gates from fully closed to fully open is also a design option available according to this range of geometries. This enables management of the motor drive system power and torque requirement and how they are utilized, as will be appreciated by those skilled in the art. In other embodiments, the connecting links 212, 214 employ a flexible member, such as chain, cable or links (not shown). Since the bulk of the flow control occurs in the gates-opening direction, a taught flexible member will provide the requisite opening control. The aforementioned over-center geometery is still achieved by selecting the orientation of the crank arms 208, 210 such that the flexible connecting links wrap somewhat about the drive shafts 204, 206 at the gates closed position.

Figure 21:
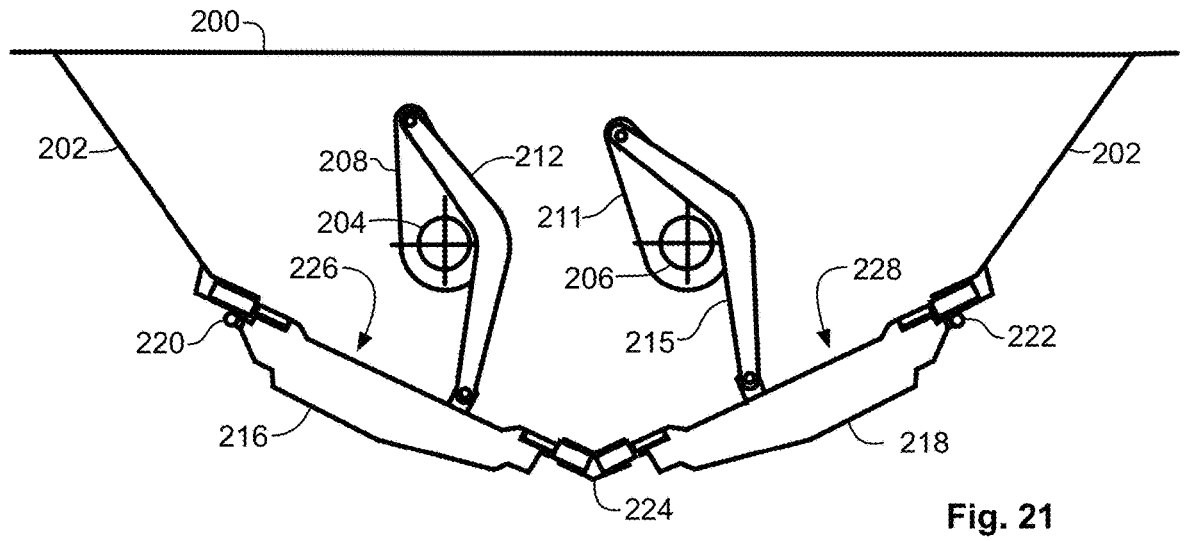
FIG. 21 is a section view drawing of a dual shaft gatebox assembly with the gates closed according to an illustrative embodiment of the present invention.

Reference is directed to FIG. 21, which is a section view drawing of a dual shaft gatebox assembly 202 with the gates 216, 218 closed according to an illustrative embodiment of the present invention. This embodiment presents the same gate box assembly 202 as in the prior figures, but with common rotation of the two drive shafts 204, 206. It will be shown hereinafter, that common versus counter rotation designs affect the options for design of the shaft synchronizer (not shown in this FIG. 21). The first drive shaft 204 employs the same crank arm 208 position and the same connecting link 212 arrangement as the immediately previous two-shaft embodiment. However, the second drive shaft 206 employs a crank arm 211 that is positioned differently, and a different connecting link 215 coupled to the second gate 218 such that clockwise rotation, as viewed in the drawing figure, of the second drive shaft drives the seance gate 218 in the gates-opening direction. An over-center geometry is still employed for both connecting links 212, 215, as discussed hereinbefore.

Figure 22:
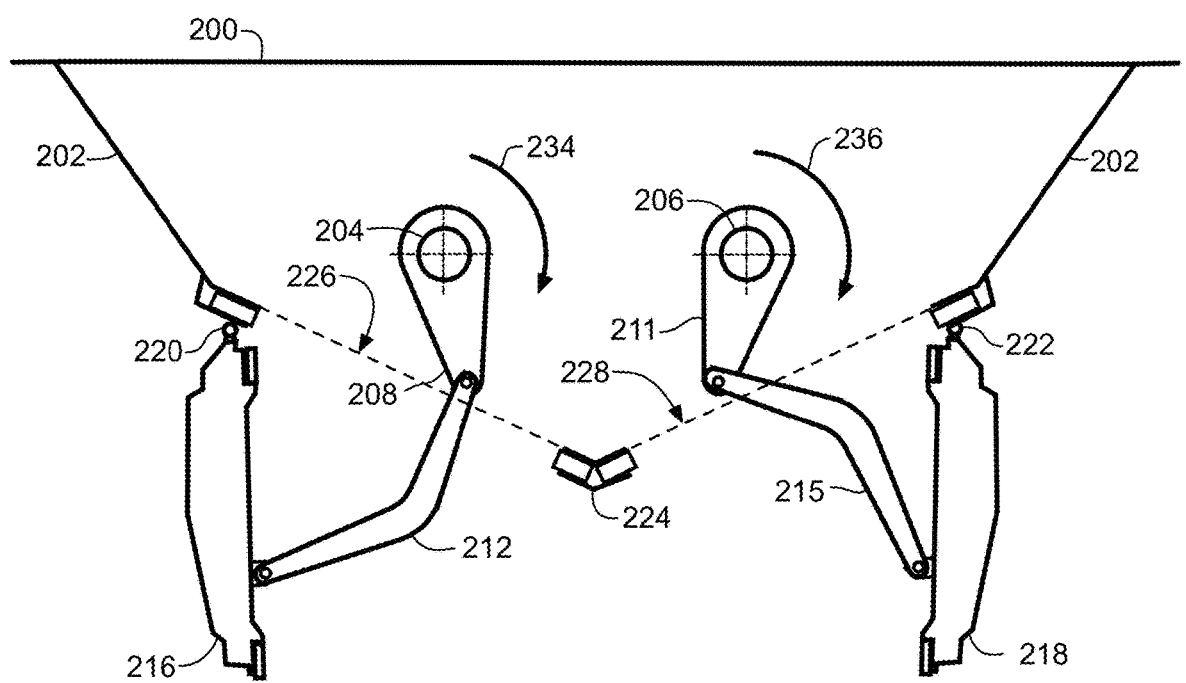
FIG. 22 is a section view drawing of a dual shaft gatebox assembly with the gates open according to an illustrative embodiment of the present invention.

Reference is directed to FIG. 22, which is a section view drawing of a dual shaft gatebox assembly 202 with the gates 216, 218 open according to an illustrative embodiment of the present invention. FIG. 22 corresponds with FIG. 21. In FIG. 21 it is shown that the first and second drive shafts 202, 206 have been rotated 234, 236 in the clockwise directions (as illustrated) such that the respective crank arms 208, 211 and connecting links 212, 215 have driven the gates 216, 218 fully toward the gates open direction. Reversing rotation of the shafts 204, 206 would drive the gates in the gates-closing direction.

Figure 23:
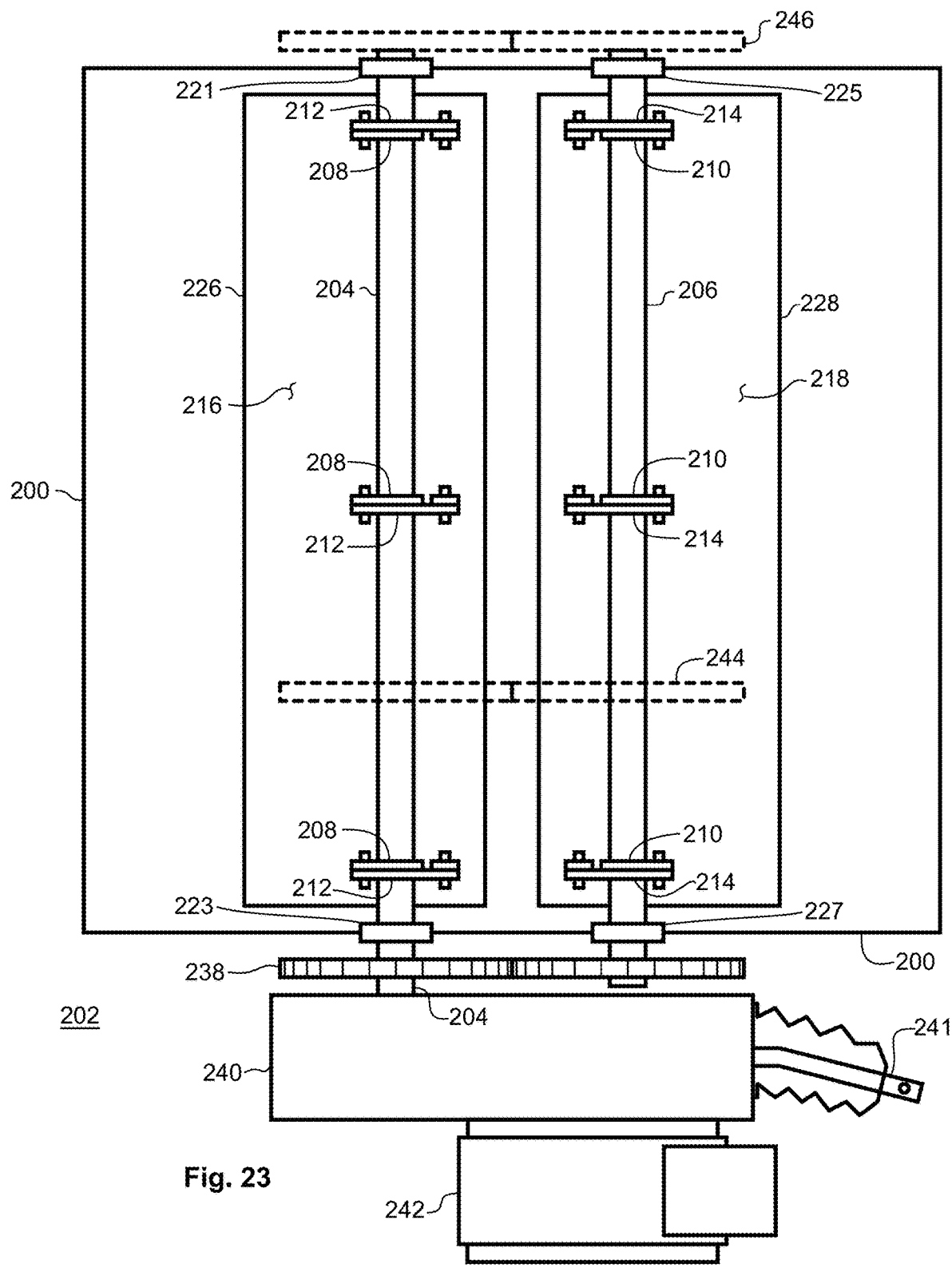
FIG. 23 is a top view drawing of a dual shaft gatebox assembly according to an illustrative embodiment of the present invention.

Reference is directed to FIG. 23, which is a top view drawing of a dual shaft gatebox assembly 202 according to an illustrative embodiment of the present invention. The mounting flange 200 is presented with the two openings 226, 228 formed through the assembly 202, and which are closed by gates 216, 218 in this view. The first drive shaft 204 is rotatable supported by end bearing/seals 221, 223. Likewise, the second drive shaft 206 is rotatable supported by end bearing/seals 225, 227. The first drive shaft 204 has three cranks arms 208 fixed to rotate therewith, and which are coupled to three connecting links 212, which are in-turn coupled to the first gate 216. Likewise, the second drive shaft 206 has three cranks arms 210 fixed to rotate therewith, and which are coupled to three connecting links 214, which are in-turn coupled to the second gate 218. This is a counter-rotation embodiment. A shaft synchronizer 238 is coupled to both the first drive shaft 204 and the second drive shaft 206, and functions to urge them in counter-rotation fashion. The first drive shaft 204 extends through the shaft synchronizer and further coupled to the output of a transmission 240, which is, in turn, driven by an electric motor 242. The transmission 240 also presents a clutch operating lever 241, as presented hereinbefore. Note that the shaft synchronizer 238 may be placed along the two drive shafts 204, 206 at any location. For example, it may be placed inside the assembly, as illustrate by broken lines 244. The shaft synchronizer may also be placed at the opposite end of the assembly, as illustrated by broken lines 246

Figure 24:
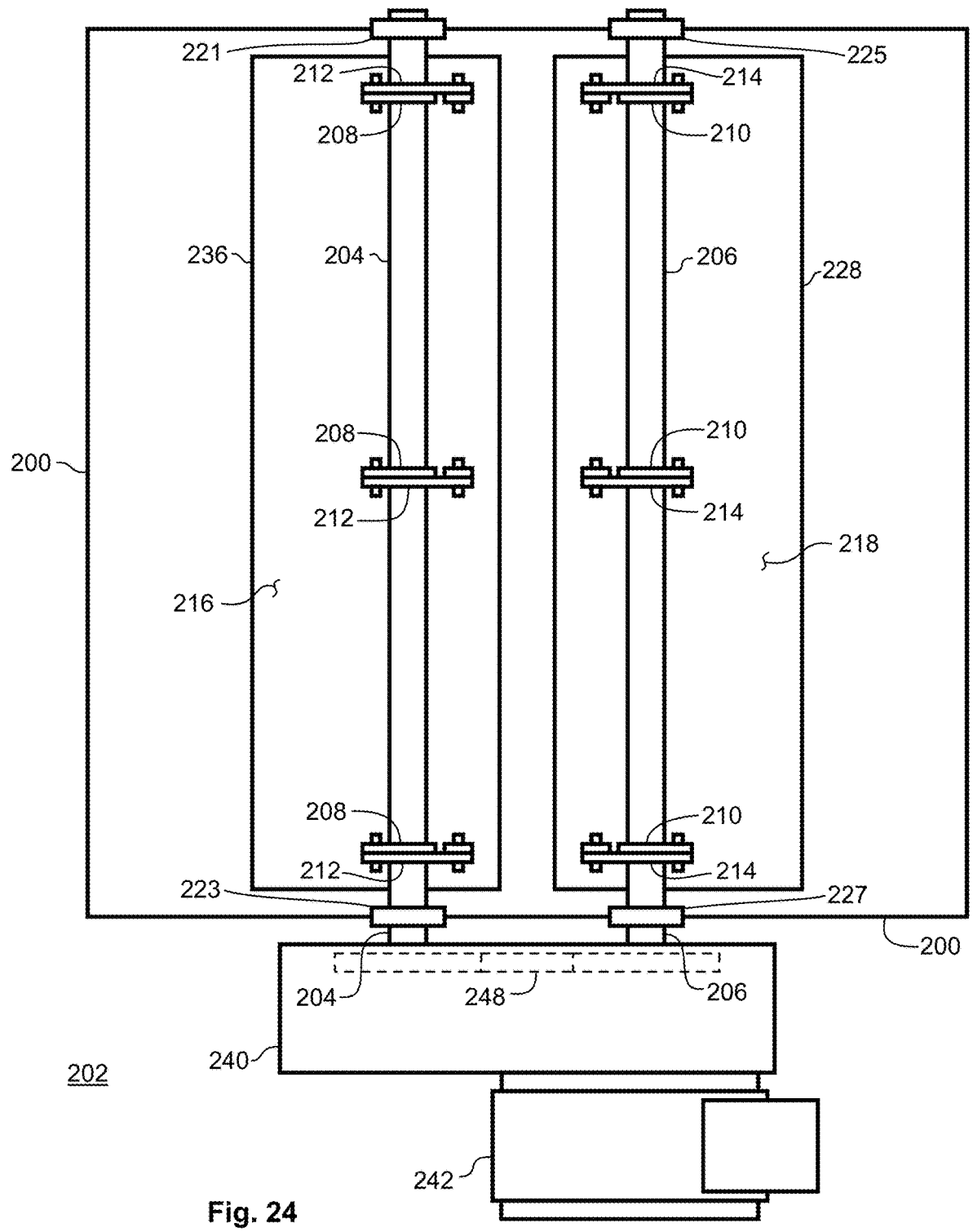
FIG. 24 is a top view drawing of a dual shaft gatebox assembly according to an illustrative embodiment of the present invention.

Reference is directed to FIG. 24, which is a top view drawing of a dual shaft gatebox assembly 202 according to an illustrative embodiment of the present invention. FIG. 24 corresponds with FIG. 23, however, in FIG. 24, the shaft synchronizer 248 is located within the transmission 240. As such, the transmission has two outputs that are coupled to the first drive shaft 204 and second drive shaft 206, respectively.

Reference is directed to FIG. 25, which is an end view drawing of a gear coupled shaft synchronizer 250 according to an illustrative embodiment of the present invention. The first and second drive shafts 204, 206 are presented with their respective crank arms 208, 210, for reference. A first spur gear 252 is fixed to the first drives shaft 204, and a second spur gear 254 is fixed to the second drive shaft 206. The spur gears 252, 254 are arranged to mesh with one another and thusly induce counter-rotation 256, 258 of the drive shafts 204, 206 with respect to one anther. Either shaft may be driven by the transmission, which will induce counter rotation in either case.

Reference is directed to FIG. 26, which is an end view drawing of a belt or chain coupled shaft synchronizer 260 according to an illustrative embodiment of the present invention. The first and second drive shafts 204, 206 are presented with their respective crank arms 208, 210, for reference. A first cogged belt sheave, or a first sprocket, 262 is fixed to the first drive shaft 204. And, a second cogged belt sheave, or a second sprocket, 264 is fixed to the second drive shaft 206. A timing belt, or a roller chain, 266 is routed about the sheaves/sprockets to synchronize their rotation in a common-rotation 268, 270 fashion. Either shaft may be driven by the transmission, which will induce common-rotation in either case.

Reference is directed to FIG. 27, which is an end view drawing of a pinion gear and geared-rack type shaft synchronizer 272 according to an illustrative embodiment of the present invention. The first and second drive shafts 204, 206 are presented with their respective crank arms 208, 210, for reference. A first pinion gear 274 is fixed to the first drives shaft 204, and a second pinion gear 276 is fixed to the second drive shaft 206. The pinion gears 274, 276 are arranged to mesh with a geared-rack 278, which is slidable retained in place, to thusly induce common-rotation 275, 277 of the drive shafts 204, 206 with respect to one anther. Either shaft may be driven by the transmission, which will induce common rotation in either case.

Reference is directed to FIG. 28, which is an end view drawing of a gear coupled shaft synchronizer 279 employing an idler gear 2897 according to an illustrative embodiment of the present invention. The first and second drive shafts 204, 206 are presented with their respective crank arms 208, 210, for reference. A first spur gear 281 is fixed to the first drives shaft 204, and a second spur gear 283 is fixed to the second drive shaft 206. The spur gears 281, 283 are arranged to mesh with and idler gear 287 disposed therebetween, and thusly induce common-rotation 289, 291 of the drive shafts 204, 206 with respect to one anther. Either shaft 204, 206, or the idler gear 287, may be driven by the transmission, which will induce common-rotation in either case.

Reference is directed to FIG. 29, which is an end view drawing of another pinion gear and geared-rack type shaft synchronizer 280 according to an illustrative embodiment of the present invention. The first and second drive shafts 204, 206 are presented with their respective crank arms 208, 210, for reference. A first pinion gear 282 is fixed to the first drives shaft 204, and a second pinion gear 284 is fixed to the second drive shaft 206. The pinion gears 282, 284 are arranged to mesh with a dual sided geared-rack 285, which is slidable retained in place along a diagonal path between the pinion gears 282. 284, to thusly induce counter-rotation 286, 288 of the drive shafts 204, 206 with respect to one anther. Either shaft may be driven by the transmission, which will induce common rotation in either case.

Reference is directed to FIG. 30, which is an end view drawing of a crank arm type shaft synchronizer 290 according to an illustrative embodiment of the present invention. The first and second drive shafts 204, 206 are presented with their respective crank arms 208, 210, for reference. A first crank arm 292 is fixed to the first drives shaft 204, and a second crank arm 294 is fixed to the second drive shaft 206. The crank arms 292, 294 are coupled together by a connecting link 296, to thusly induce common-rotation 298, 300 of the drive shafts 204, 206 with respect to one anther. Either shaft may be driven by the transmission, which will induce counter rotation in either case. With this embodiment, shaft rotation is limited to somewhat less than one hundred eighty degrees.

Figure 31A:
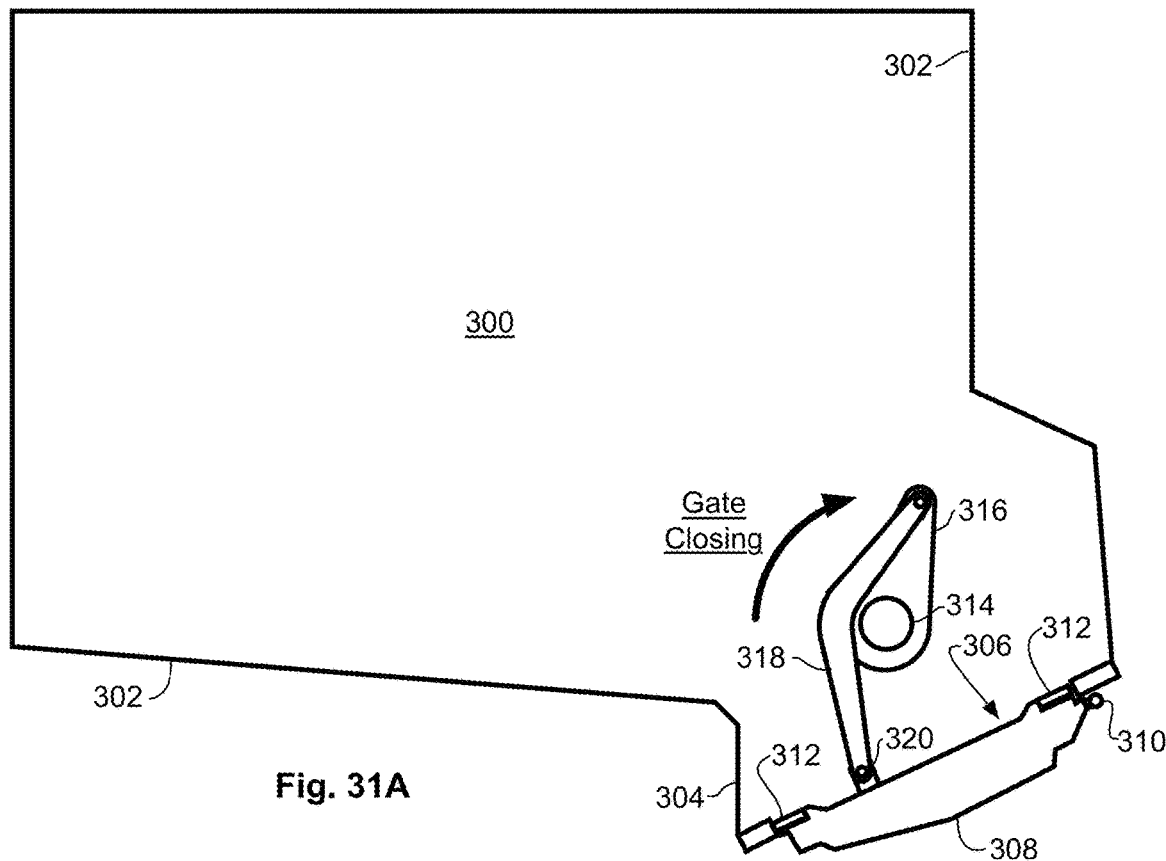
FIGS. 31A and 31B are section view drawings of a single gate, single drive shaft dump gate system according to an illustrative embodiment of the present invention.
Figure 31B:
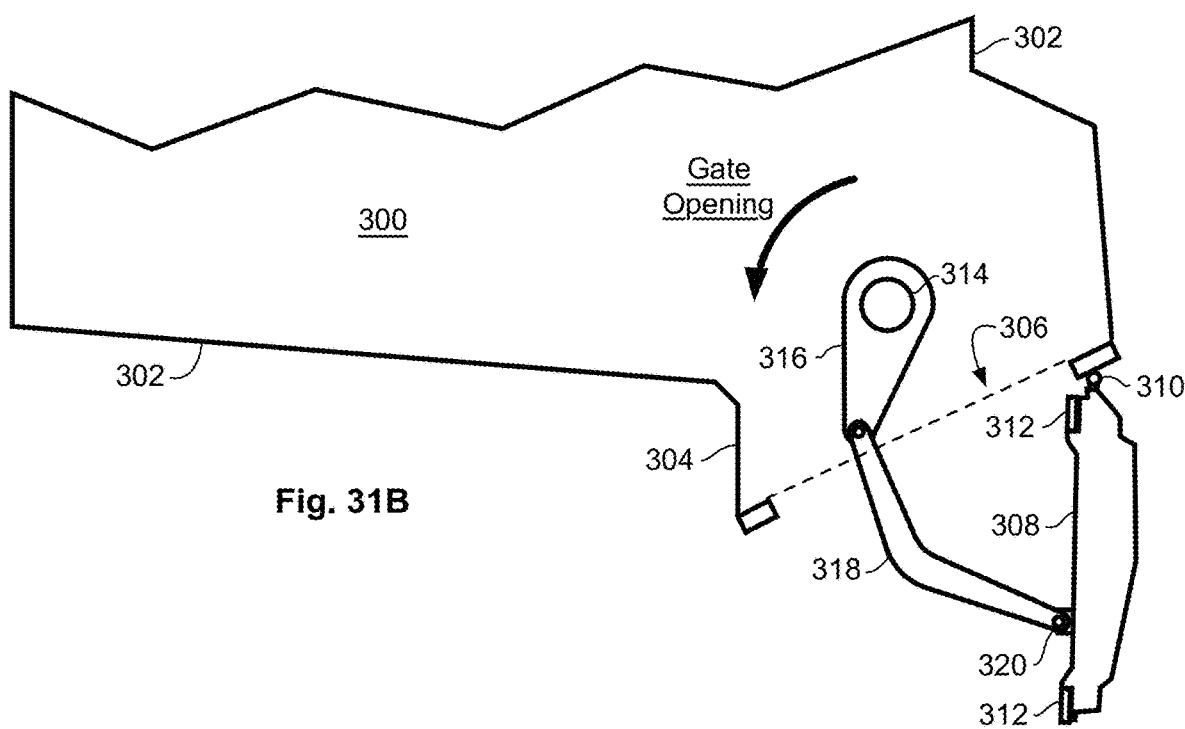

Reference is directed to FIGS. 31A and 31B, which are section view drawings of a single gate, single drive shaft dump gate system according to an illustrative embodiment of the present invention. In this illustrative embodiment, which is suitable for lighter aircraft, an integrated hopper and dump gate system 300 is employed. A hopper tank portion 302 contains fire retardant, which may flow out an exit portion 304 through a gate opening 306, which is selectively sealable with a gate 308. The gate 308 is surrounded with a seal 312, such as an O-ring or other polymeric seal, as are known to those skilled in the art. A hinge 310 is disposed along an edge of the gate opening 306, as illustrated. As such, the gate 308 is enabled to swing away from the gate opening 306 to release the fire retardant (not show). A drive shaft 314 is located within the hopper 302/304 has one or more crank arms 306 fixed thereto to rotate together therewith. The various drive arrangements discussed hereinbefore may be employed to rotate and control movement of the drive shaft 314. A connecting link 318 is pivotally connected to the the crank arm 316 at a first end, and is further pivotally connected to a mount 320 on the gate 308 at the other end. As such, rotation of the drive shaft 316 in a gate-closing direction and a gate-opening direction enables control of the gate 308 opening and flow of the fire retardant from the hopper 302. This embodiment also employs the over-center geometry discussed hereinbefore, and well as the interference between the connecting link 318 and the drive shaft 3014 to prevent over rotation in the gate-closing direction.

The present disclosure further teaches an improved firegate dump system exhibiting improved efficiency and reduced weight by utilizing a direct drive servo-motor that employs a permanent magnet rotor fixed to the dump gate system drive shaft. This improved design eliminates the need for a transmission or gear reduction drive, and eliminates the need for a declutching mechanism between the motor drive and the dump gate drive shaft. The direct drive servomotor is also referred to as a "torque motor" in this application because it is the torque provided by the servomotor that directly drives rotation of the drive shaft as well has provides sufficient torque capacity to hold the shaft at selected position s. Over-center firegate linkage techniques are employed to hold the firegate closed while the fire retardant hopper is full, such as during transit of the aircraft from a fill station to a retardant drop location. The improved system further benefits by reduced weight from the omission of the foregoing components. In addition, the simplicity of the design and implementation improve overall system efficiency are improved over prior embodiments as well. The servomotor comprises a permanent magnet rotor attached to the firegate drive shaft and an electromagnetically wound stator that is fixed to the dump gate system hooper, which are precisely aligned to implement a torque motor that does not require a separate motor frame and bearing assembly, further reducing equipment weight.

The core components of the torque motor, including the permanent magnet rotor and electromagnetically wound stator, as well as corresponding servomotor controllers are commercially available from Allied Motion Technologies, Inc., in it's Megaflux™ frameless brushless torque motor product range (see: https://www.alliedmotion.com/brushless-motors/brushless-direct-drive-torque-motors/). Specific torque requirements in firegate applications will depend on the size of the gates, the volume of fire retardant therein, as well as aircraft dynamics. Where torque requirements exceed the capacity of a single torque motor, plural torque motors may be stacked to multiply torque capacity as needed. At the time of this writing, torque motors exceeding thirteen hundred ft.-lbs. of continuous stall torque are available. In applications according to the present disclosure, peak torque requirements reach approximately 1,200 ft.-lbs., with a considerably lower continuous torque rating requirement.

While the implementation of a direct drive torque motor does reduce equipment requirements, an emergency dump operator is still necessary in the event of other system failures. This same emergency dump arrangement discussed hereinbefore can be applied, where each enables the aircraft pilot to manually rotate the firegate drive shaft past the over-center position such that gravity causes the gate(s) to fall open and release of the fire retardant. The emergency dump system also includes an interface to the torque motor controller that removes all power to the motor stator such that it offers no resistance to the pilot's manual efforts. The torque motor implementation may also be used in conjunction with a mechanical brake if it is desirable to hold the load without power present. This is optional, and in certain embodiments, the load can be held with a mechanical latch arrangement when power is removed.

Figure 32C:
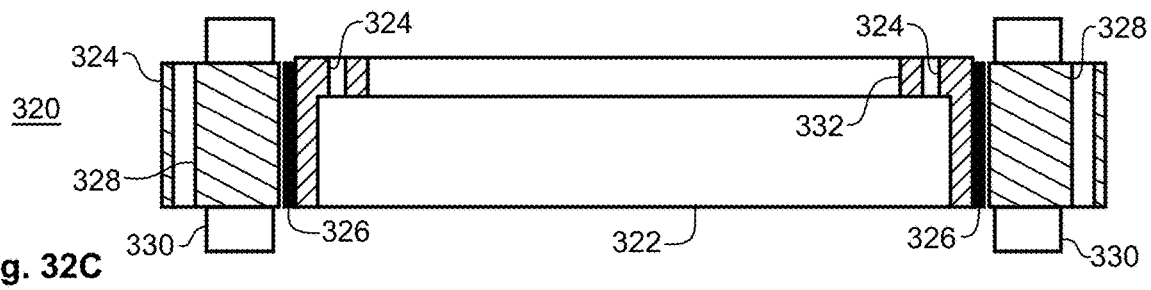
FIGS. 32A, 32B, and 32C are a front view drawing, a side view drawing, and a section view drawing, respectively, of a servo motor assembly according to an illustrative embodiment of the present invention.
Figure 32B:
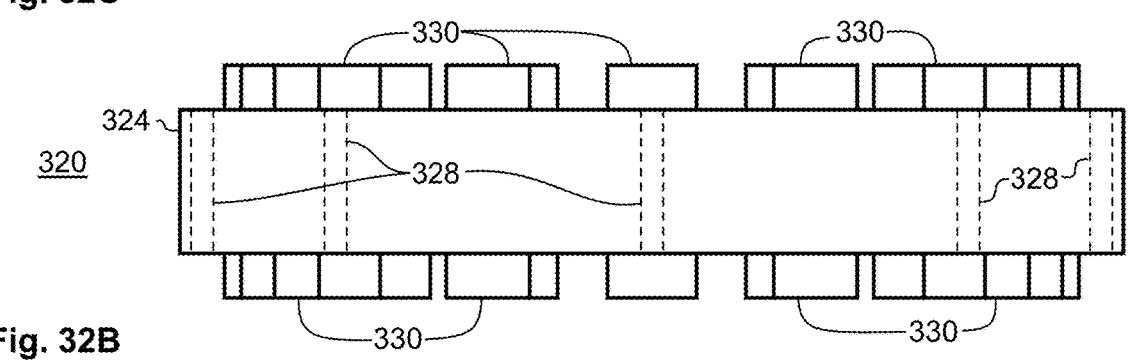
Figure 32A:
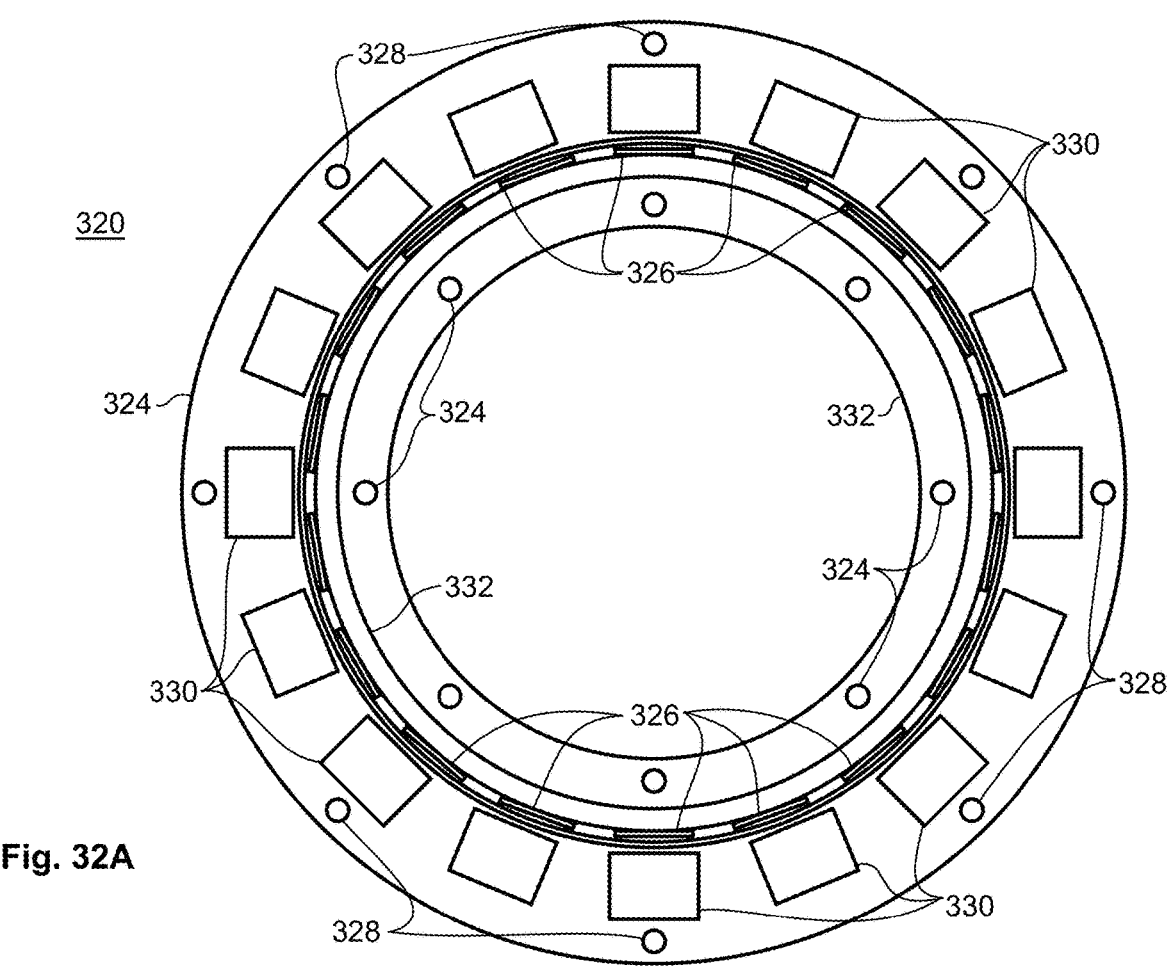

Reference is directed to FIGS. 32A, 32B, and 32C, which are a front view drawing, a side view drawing, and a section view drawing, respectively, of a torque motor servomotor assembly 320 according to an illustrative embodiment of the present invention. The assembly 320 comprises a permanent magnet rotor 322 and and an electromagnetically wound stator 324, which are not supported in a cooperative frame, but which must be held in corresponding alignment, as illustrated, when implemented in the firegate embodiments of the present disclosure. The rotor 322 has disposed about its periphery a plurality of permanent magnets 36 in sequential magnetic pole arrangement. The rotor 322 has plural mounting holes 324 for attachment to a corresponding rotating structure in the firegate system (not shown). The stator 324 has a plurality of electromagnets 330 wound through its circumference, which implement a multi-pole rotating magnetic field under control of a servomotor controller (not illustrated). In operation, the rotating magnetic field induces rotation of the rotor 322 providing substantial torque thereinto. The stator 324 includes a plurality of mounting holes 328 for connection in fixed orientation with the firegate hopper (not illustrated) in the illustrative embodiment.

Figure 33:
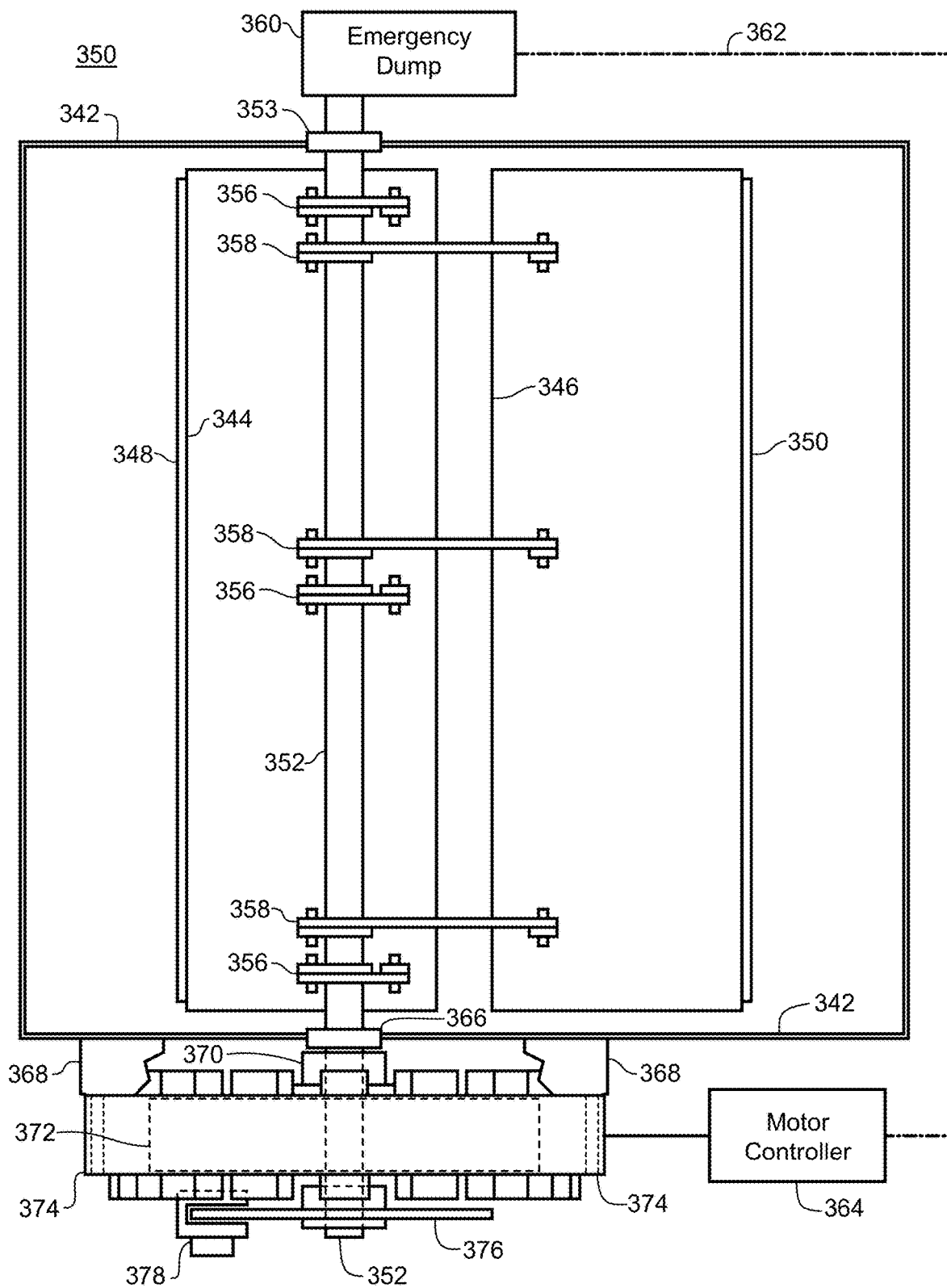
FIG. 33 is a top view drawing of a single shaft gatebox assembly with servo motor drive according to an illustrative embodiment of the present invention.

Reference is directed to FIG. 33, which is a top view drawing of a single shaft gatebox assembly 350 with torque motor servomotor drive 372, 374 according to an illustrative embodiment of the present invention. The dump gate system hopper 342 includes a pair of dump gates 344, 346 fixed thereto with hinges 248, 350, respectively. A drive shaft 352 is disposed within the hopper 342, and is coupled to the gates 344, 346 using corresponding pluralities of crank arms and connecting links 356, 358 as described in other embodiments hereinbefore. One end of the drive shaft 352 passes through a bearing and seal 353 and is coupled to an emergency dump system 360, according to embodiments described hereinbefore. The other end of the drive shaft 352 passes through a second bearing a seal 366 to the exterior of the hopper 342, and is fixed to the rotor 372 of the torque motor using a rotor flange 370, and is thusly held in precise rotatable alignment with the drive shaft 352 as oriented with the hopper 342.

The stator 374 of the torque motor is fixed to the exterior of the hopper 342 using a stator bracket 368, which positions the stator 374 in precise alignment with the rotor 372. At the distal end of the drive shaft 352 is brake disc 376 affixed thereto to rotate together therewith. A brake caliper 378 is positioned about the bake disc 376, to apply selective braking forces thereto, including sufficient force to prevent rotation of the drive shaft 352 altogether. It will be appreciated by those skilled in the art that any manner of braking apparatus could be used in place of the disc brake arrangement of the illustrative embodiment. A servomotor controller 364 provides coordinated three-phase electric connection to implement the aforementioned rotating magnetic field in the stator 374. An interface signal 362 is coupled from the emergency dump system 360 to the motor controller 364, so as to disable the torque motor when the emergency dump system is activated.

Figure 34:
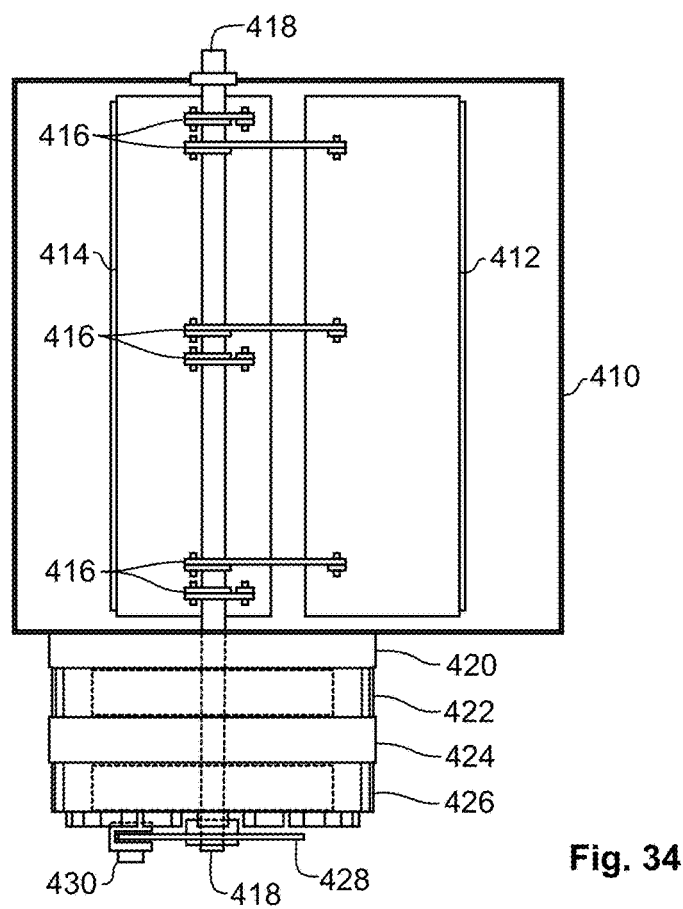
FIG. 34 is a top view drawing of a single shaft gatebox assembly with a plural servo motor drive assembly according to an illustrative embodiment of the present invention.

Reference is directed to FIG. 34, which is a top view drawing of a single shaft gatebox assembly with a plural servo motor drive assemblies according to an illustrative embodiment of the present invention. This embodiment illustrates the use of stacked torque motors stators 422, 426 to provide maximum torque multiplication, as may be required in certain applications of the illustrative embodiment. The gate box hopper 410 has a pair of firegates 412, 414 that are driven through connecting linkages 416 by a drive shaft 418. A first motor bracket 420 supports a first stator 422, which is coupled to second motor bracket 424 to a second stator 426. A brake disc 428 is fixed to the distal end of the drive shaft 418, and is brakingly engaged by a brake caliper 430, as described hereinbefore. Plural toque motors can be stacked in like manner.

Figure 35:
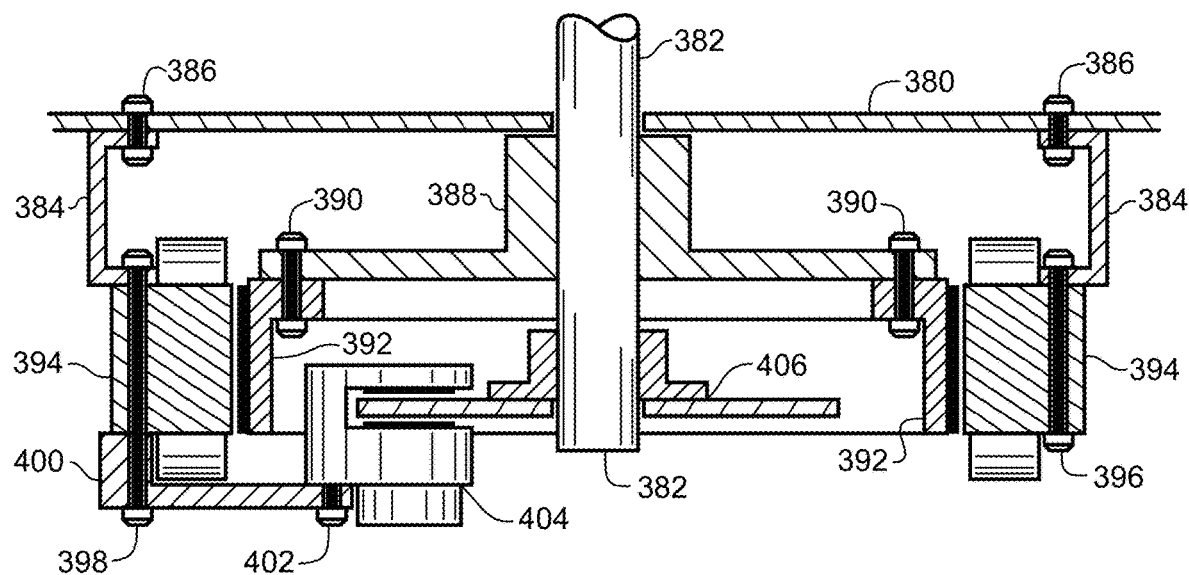
FIG. 35 is a section view drawing illustrating a disc brake arrangement.

Reference is directed to FIG. 35, which is a section view drawing of a servo motor drive and brake assembly according to an illustrative embodiment of the present invention. This embodiment illustrates certain details of a torque motor installation on a firegate hopper wall 380. The drive shaft 382 passed through the wall 380 to the exterior. A rotor flange 388 is fixed to the shaft 382 and is bolted 386 to the torque motor rotor 292, so as to be precisely located and in common rotation together therewith. A brake disc 406 is fixed to the distal end of the shaft 382. A stator bracket 384 is bolted to the hopper wall 380, and is further bolted 398, 396 to the stator 394, as illustrated. Thusly, the rotor 392 and stator 394 are held in precise alignment. A brake caliper bracket 400 is bolted 398 to the rotor 394, and further bolted 402 to a brake caliper 404, which is aligned to brakingly engage the brake disc 406. Note that the brake components 406, 404 can be located internal of the rotor 392, to provide a compact system.

In another group of illustrative embodiments of the present disclosure, one or more electric linear actuators are employed to operate the gates in a firegate dump gate system. The electric linear actuators provide the driving torque required to operate one or more gates, and replaces the previously discusses rotary electric motor and motor/transmission operated embodiments. Such firegates may employ one or more gates, one or more drive shafts, one or more electric linear actuators, and may include additional external linkages to convert the linear actuator movement into a rotary motion used in the rotating the drive shafts in the gates-opening and gates-closing directions. Synchronization linkage may also be employed between plural drives shafts in multiple drive shaft embodiments to provide in-phase or out-of-phase gate operation.

The electric linear actuator of these illustrative embodiments include a linear electric driver and an actuator rod. Electric current is applied to the linear electric driver by a linear drive controller, which converts the electric current into linear force that is applied to the actuator rod such that the linear drive controller is operable to extend and retract the actuator rod. This linear motion and force is applied through a drive crank arm arrangement to induce rotation in a drive shaft, analogous in mechanical arrangement to a piston, connecting rod and crankshaft in an internal combustion engine.

The linear actuator embodiments contemplate two types of electric linear actuators, which are linear electric motors and electric motor driven balls screw actuators. Linear electric motors are electromagnetic direct drives in tubular form. The linear motion is produced purely electrically, without any intermediate mechanical couplings. The linear motor consists of just two parts, the slider and the stator. The slider is typically made of neodymium magnets that are mounted in a stainless steel tube. The stator contains the motor windings, bearings for the slider, and position sensors, in addition to other interface control and circuitry. An internal position sensor measures and monitors the current position of the linear motor not only when it is stopped, but also during the motion. Linear electric motors can be positioned freely within the entire range of the actuator rod stroke. In addition, both the travel speed and the acceleration can be controlled precisely. Thus, a linear electric motor includes an electromagnetic stator and a permanent magnet slider that is inserted into the magnetic fields generator by the electromagnetic stator. Both of these units are linearly arranged. The stator may employ three-phase coil arrangements to thereby apply constant force to the slider, whether stationary or in motion. The slider provides a reactive magnetic field in the form of a linear stack of high flux density magnets, such as neodymium alloy magnets. One source of such linear electric motors is LinMot USA, Inc., located at N1922 State Road 120, Unit 1, Lake Geneva, WI 53147, who provides on-line information at http://www.linmot-usa.com. It has been determined that the LinMot P10-70 series of linear electric motors are effective for firegate applications.

The other type of electric linear actuator contemplated in these illustrative embodiments is the electrically driven ball screw actuator, which consists of a threaded actuator rod and a motor driven recirculating ball screw driver that is rotated by an conventional electric motor to yield positionable linear force in the actuator rod. The threaded actuator rod has a helical raceway formed on its exterior which is engaged by a recirculating parade of ball bearings, which together function as a low friction, precision screw. The ball assembly acts a 'nut' riding upon the actuator rod, and is rotated by the motor to extend and retract the actuator rod.

Figure 36:
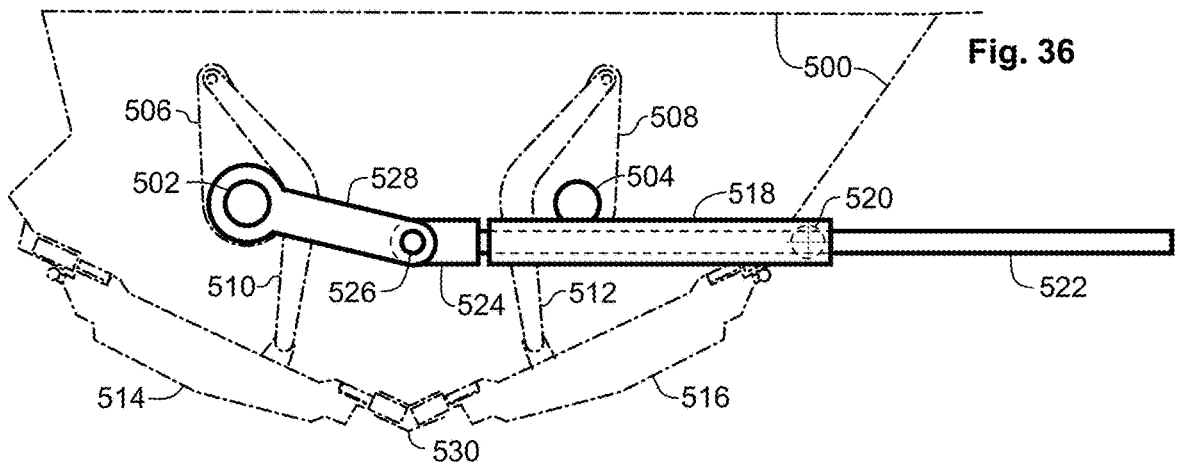
FIGS. 36, 37, and 38 are end view drawing of a dump gate system at closed, partially open, and fully open positions, respectively, which employ an electric linear actuator.
Figure 37:
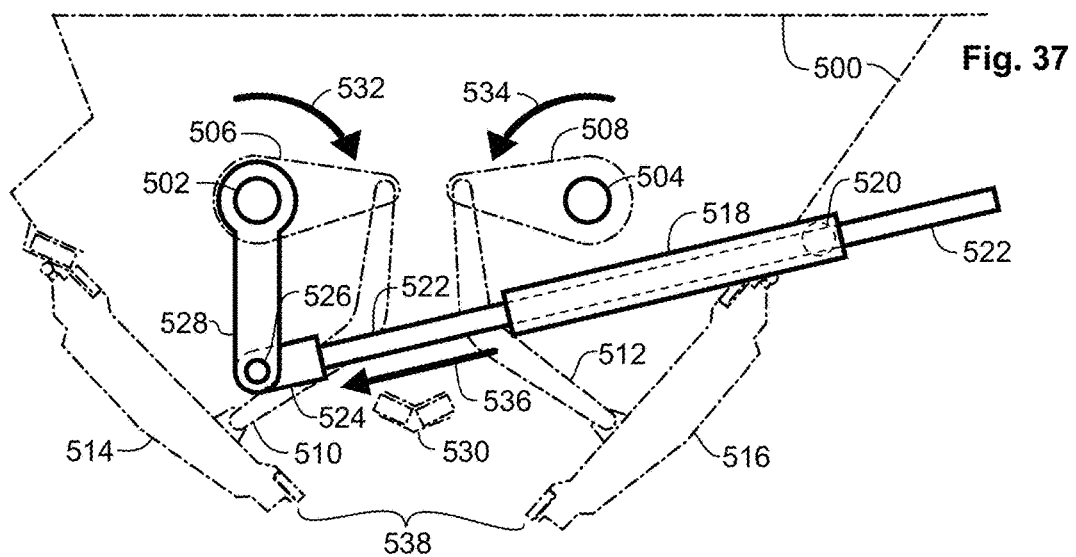
Figure 38:
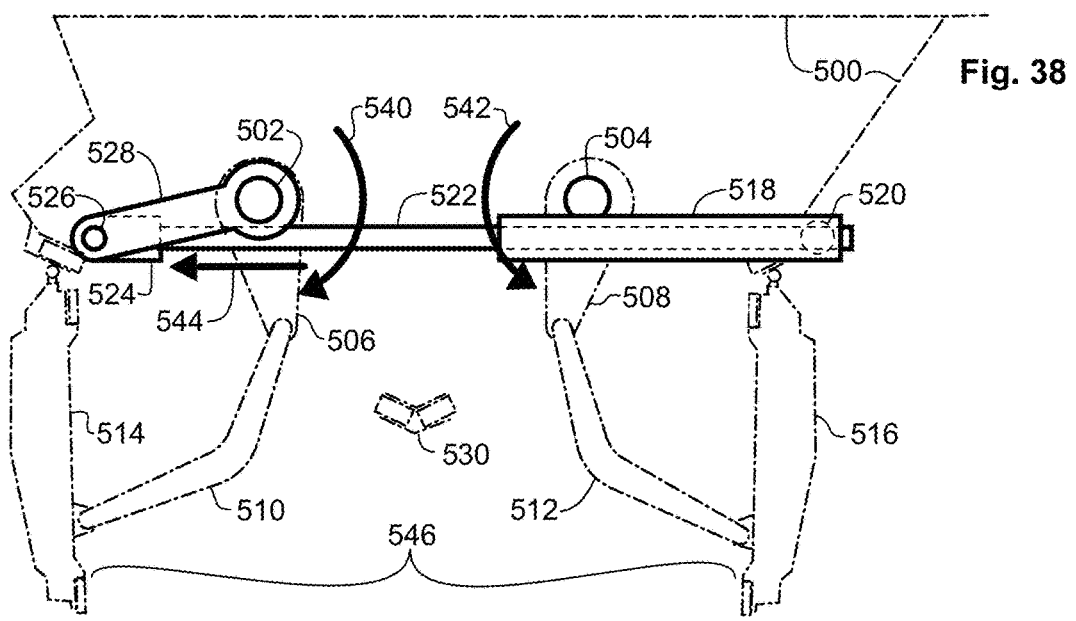

Reference is directed to FIGS. 36, 37, and 38, which are end view drawings of a dump gate system at closed, partially open, and fully open positions, respectively, which employ an electric linear actuator, according to an illustrative embodiment of the present disclosure. A linear electric motor graphic is used as an exemplar in these figures. In FIG. 36, the hopper 500 with gates 524, 516 are drawn in phantom. Drive shafts 502 and 504 are disposed within the hooper 500, each having a corresponding crank arm 506, 508 connected to the gates 514, 516 by respective connecting links 510, 512. A seal 530 is provided near the bottom of the hopper 500 for sealably engaging the gates 514, 516 at the closed position, thereby retaining the fluid (not shown) in the hopper 500. All these items are drawn in phantom, as they generally correspond with certain previously disclosed embodiments. These particular drawings now disclose the implementation of a linear electric motor type of electric linear actuator (generally a linear electric driver, item 518, and actuator rod, item 522), coupled to a drive crank arm 528 attached to a shaft extension 501 of drive shaft 502, as will be more fully discussed below.

In FIGS. 36, 37, and 38, the linear electric motor consists more particularly of an electromagnetic stator 58 located with respect to the hopper 500 by anchor pivot 52, and a magnetic slider 522 disposed to slide within the stator 518. Note that the stator 518 can both urge movement of the slider 522 as well has hold the slider at any given position by virtue of magnetic field control in the stator 518. A pivotal end fitting 524 engages a first drive crank 528 that is fixed to an external shaft extension 501 of drive shaft 502. As will be appreciated by those skilled in the art, the extension and retraction of the slider (generally, the actuator rod) will induce rotation of the drive shaft 50 through the first drive crank 528, while the pivotal end fitting 524 and anchor pivot 520 serve to enable the reciprocating action of the combined mechanism. Note in FIG. 36 that the second drive shaft 504 appears to be unconnected to the overall mechanism. This is illustrated for clarity, and a synchronizing mechanism that coordinate movement of both the first drive shaft 502 and the second drive shaft 504 will be more full discussed hereinafter.

While FIG. 36 illustrated the gates 514, 516 in the closed position, FIG. 37 illustrates the gates 514, 516 in a partially open position, by a distance 538 about the hopper seal 530. The opening action is facilitated by extension movement 536 of the slider 522 through the stator 518. This action induced rotation 532 of the first drive shaft 502 in the gates-opening direction through the first drive crank 528. Note that the second drive shaft 504 is simultaneously rotated 534 in its gates-opening direction by a shaft synchronizer mechanism (not shown) that will be more fully described hereinafter.

FIG. 38 illustrates the gates 514, 516 in the fully open position by a distance 546. This action is a is facilitated by full extension 544 of the slider 522 through the stator 518. This action completes rotation 540 of the first drive shaft 502 in the gates-opening direction through the first drive crank 528. Note that the second drive shaft 504 is simultaneously rotated 542 to its fully open position. Note that these FIGS.

36, 37, 38 illustrate a two gate 514, 516, two drive shaft 502, 504 embodiment. A single gate, single drive shaft embodiment would be similar, omitting the second drive shaft and second gate, as well as the shaft synchronizers, to be discussed hereinafter. In similar arrangement to the embodiment illustrated in FIGS. 5, 6, 7, a single drive shaft, two gate embodiment can be realized.

Figure 39:
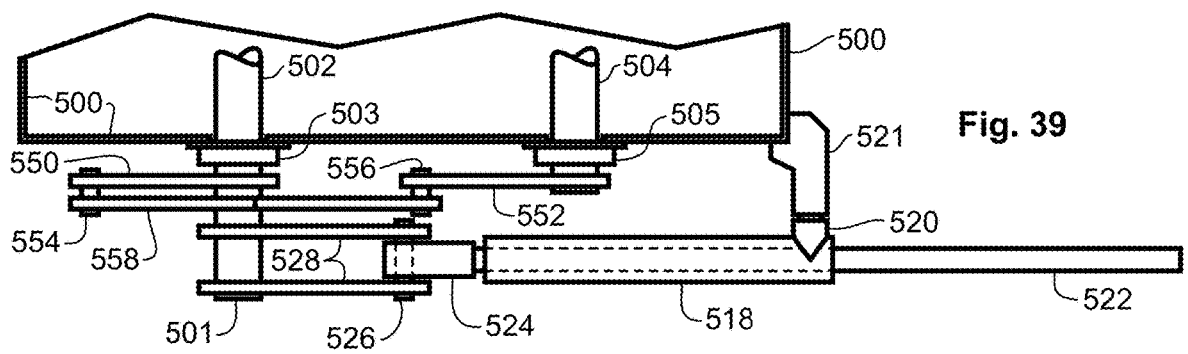
FIG. 39 is a top view drawing of a drive linkage arrangement in a dump gate system that employs an electric linear actuator.

Reference is directed to FIG. 39, which is a top view drawing of a drive linkage arrangement in a dump gate system that employs an electric linear actuator. This drawing figure corresponds with FIGS. 36, 37, and 38. In FIG. 39, a shaft synchronizer embodiment is further disclosed. The hopper 500 supports the first and second drives shafts 502, 504 on respective bearing and liquid seal assemblies 503, 505. The first drive shaft 502 includes a shaft extension 501. The anchor pivot 520 is fixed to the hopper 500, and pivotally supports the electromagnetic stator 581 upon a suitable bracket 521. The stator 518 extends and retracts the magnetic slider 522 to drive the first drive crank 528 through end link 524 with a pivot pin 526, thereby rotating the shaft extension 501 and first drive shaft 502. The shaft synchronizer is comprised of a first phasing crank 550 fixed to the shaft extension 501 and a second phasing crank 552 fixed to the second drive shaft 504. And, a phasing link 558 that pivotally connects the distal ends of the phasing cranks 550, 552 through respecting pivot pins 554, 556. Operation of the foregoing mechanism will now be presented.

Figure 40:
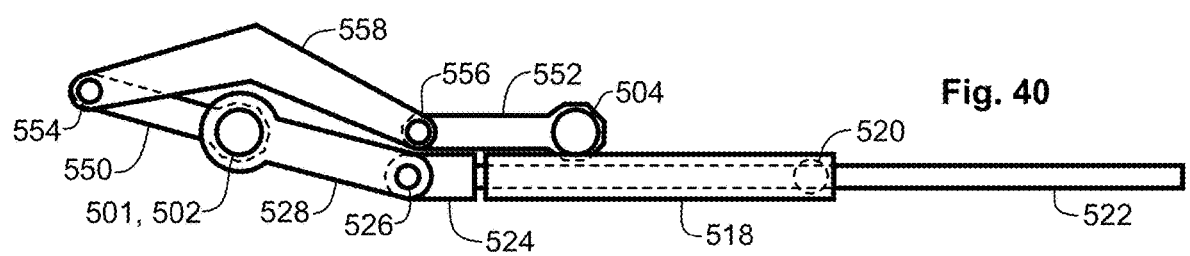
FIGS. 40, 41, and 42 are end view drawing of a drive linkage in a dump gate system at closed, partially open, and fully open positions, respectively, which employ an electric linear actuator.
Figure 41:
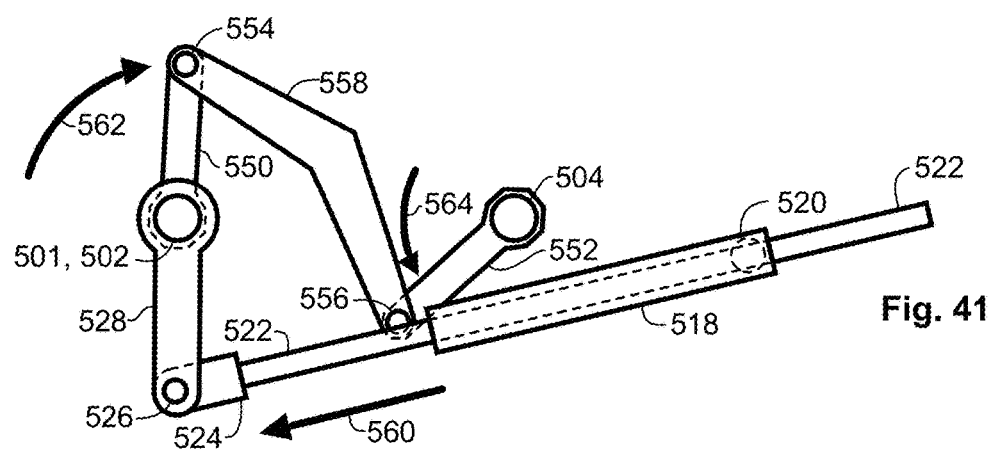
Figure 42:
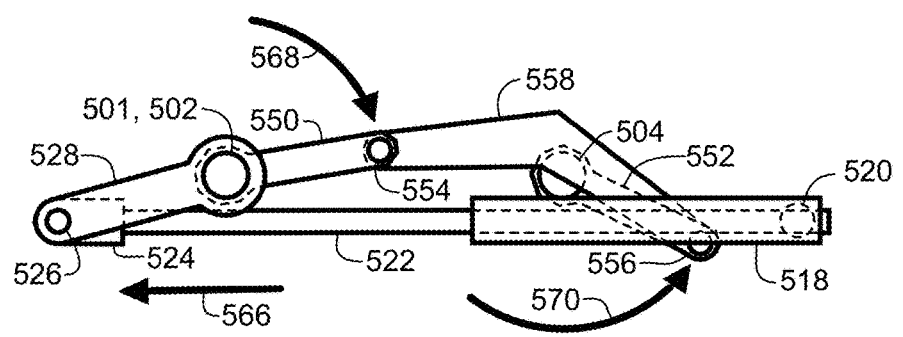

Reference is directed to FIGS. 40, 41, and 42, which are end view drawings of the drive and phasing linkage in a dump gate system at closed, partially open, and fully open positions, respectively, which employ an electric linear actuator. In these figures, the hopper, internal crane arms, internal connection links, and gates are omitted so that the drive and phasing arrangement can be more clearly comprehended. FIG. 40 illustrates the shaft synchronizer assembly in the gates-closed position. The stator 518 and slider 522 are in the fully retracted position. The end link 524 and pivot 526 hold the drive crank 528 in the closed position. The first phasing crank 550 is fixed the the shaft extension 501, and the second phasing crank 504 is fixed to the second drive shaft 504. The phasing link 558 is pivotally connected 554, 556 to the distal ends of the two phasing cranks 550, 552, as illustrated in the gates-closed position. Thus, the holding torque of the stator/slider 518/522 hold the assembly in the gates-closed position. A mechanical brake may also be employed to hold the mechanism in place without the consumption of drive power.

In FIG. 41, the stator 520 has extended the slider 522 by a distance 560. This action urges the stator 518 to pivot about the anchor pivot 502, and the end link 524 and pivot 526 of the slider 52 urge the shaft extension 501 to rotate 562 in the gates-opening direction through the first drive crank 528. The first phasing crank 550 simultaneously rotates 562, which thereby couples the motion through phasing link 558 to the second phasing crank 552, to simultaneously rotate 564 the second phasing crank 552 and second drive shaft 504, also in its gates-opening direction. Note that in this embodiment, the shaft are counter-rotating. FIG. 42 illustrates the completion of the opening sequence. The stator 518 fully extends the slider 522, urging the shaft extension 501 to fully rotate 568 in the gates-opening direction through the first drive crank 528. The first phasing crank 550 continues to rotate 568, which thereby couples the motion through phasing link 558 to the second phasing crank 552, to simultaneously rotate 570 the second phasing crank 552 and second drive shaft 504 to their fully open positions. The gates-closing operation is in reverse, as the stator 518 retracts the slider 522 in like fashion.

Figure 43:
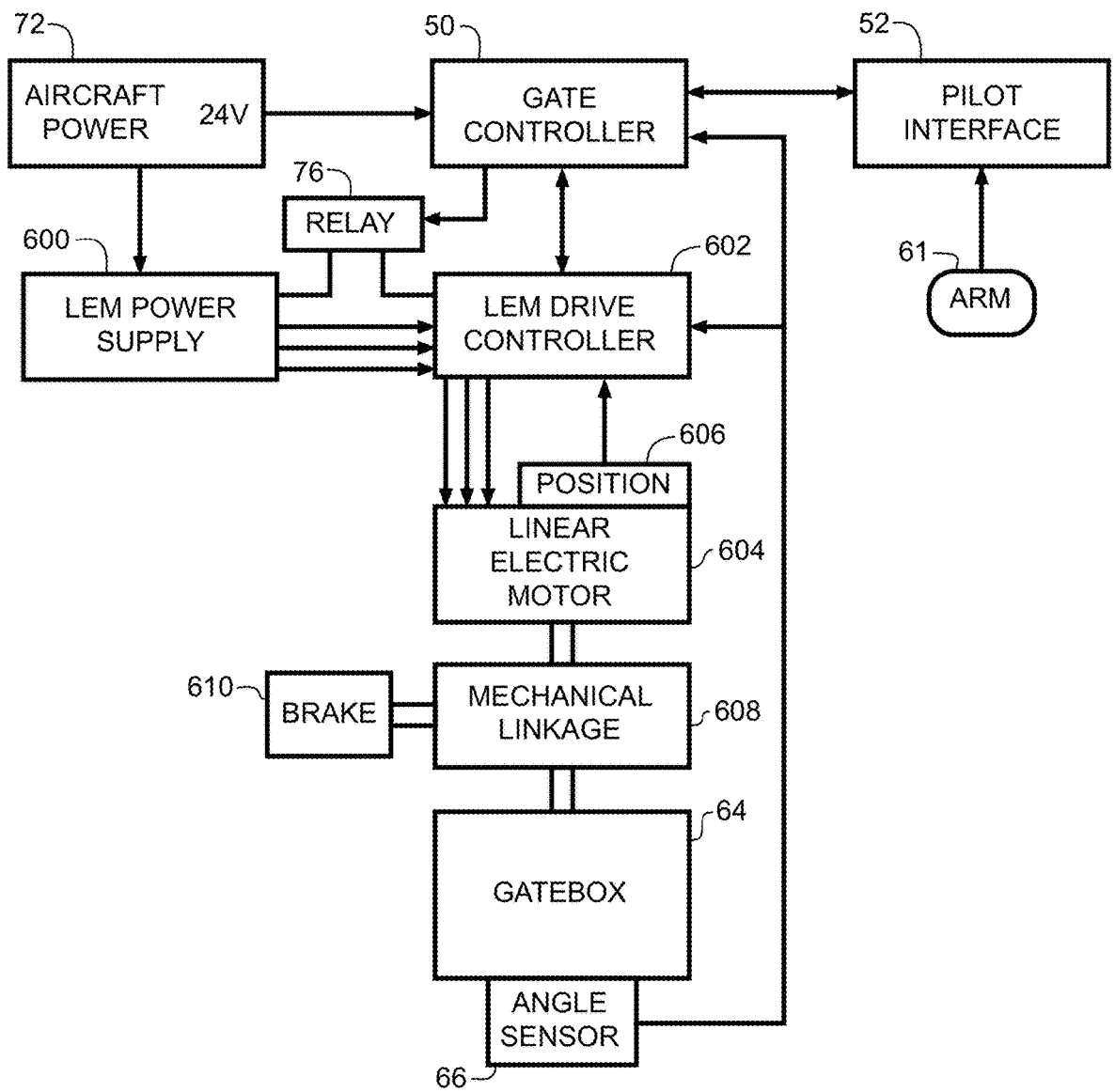
FIG. 43 is a functional block diagram of a dump gate system that employs an electric linear actuator.

Reference is directed to FIG. 43, which is a functional block diagram of a dump gate system that employs an electric linear actuator. Note that the aircraft power supply 72, the gate controller 50, control relay 76, pilot interface 52 and arming actuation 61 have been previously detailed with respect to FIG. 1, hereinbefore. The electric linear actuator embodiments vary with the following alternative devices and functions. In the case of the linear electric motor 604 implementation of the electric linear actuator, it is preferred to employ a LEM power supply 600 that prides higher output voltage and optionally three phase power. For example, a switching power supply that outputs three-phase 400 volts AC power provides good performance. A dedicated linear electric motor controller 602 accepts the power and drives the linear electric motor 604. Such controllers of available from the linear electric motor suppliers. A position sensor 606 in the linear electric motor outputs a position signal to the controller 602, which in turn, outputs position information the gate controller 52. Various mechanical linkages 608, as discussed hereinbefore, couple the actuator rod of the electric linear actuator, a linear electric motor 604 in this embodiment, to the gate box assembly 64. As discussed hereinbefore, the gatebox 64 may include an angle sensor 66 that outputs gate position information to the gate controller 50. Also note that while the linear electric motor has the capability to hold position against forces induced by the mechanism and payload, an external mechanical or electrical brake 610 my be employed. Such brakes have been discussed hereinbefore, and may be applied to the gate drive shafts or along the linkages.

Figure 44:
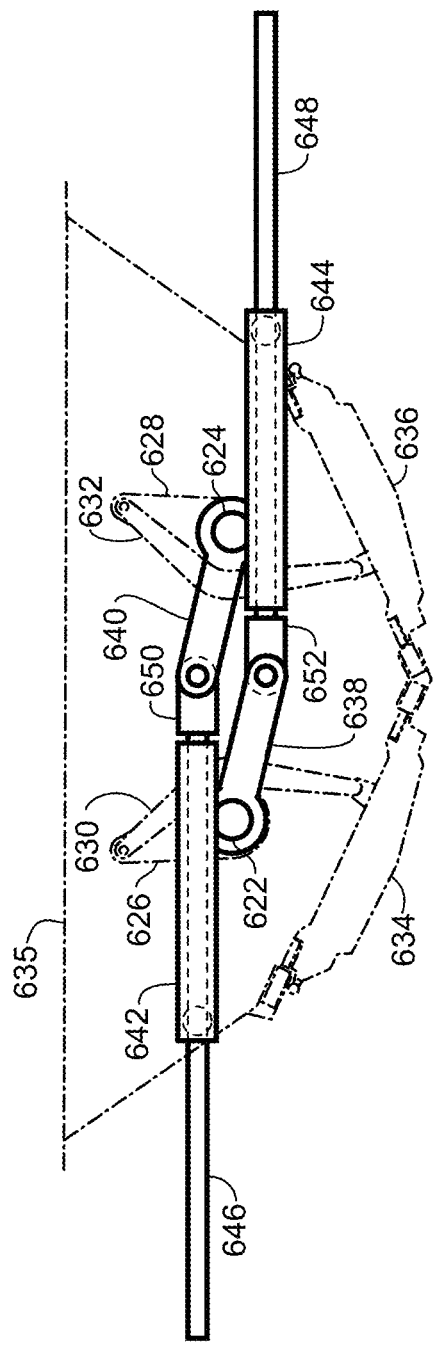
FIG. 44 is an end view drawing of a drive linkage arrangement in a dump gate system that employs dual electric linear actuators.

Reference is directed to FIG. 44, which is an end view drawing of a drive linkage arrangement in a dump gate system that employs dual electric linear actuators. In this alternative embodiment, a pair of electric linear actuators are employed to individually control a first gate 634 and a second gate 636 in a hopper 635. This embodiment employs a first linear electric motor comprised of a first stator 644 and a first slider 648 having an end link 652 that pivotally connects to a first drive crank 638, which is fixed to the first drive shaft 622. Within the hopper 635, a first crank arm 626 connects to a first connecting link 630 operate the first gate 634. In like fashion, a second linear electric motor comprised of a second stator 642 and a second slider 646 having an end link 650 that pivotally connects to a second drive crank 640, which is fixed to the second drive shaft 624. Within the hopper 635, a second crank arm 632 connects to a second connecting link 632 operate the second gate 636. With this arrangement, it is the linear electric motor drive controller (not shown) that controls timing and phasing of the gate 634, 636 operation. The use of dual linear actuator reduces the torque requirement of each.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A dump gate system for a hopper that contains fluid in a firefighting aircraft, comprising:

a first gate opening located adjacent a lower portion of the hopper;

29 a first gate that sealably engages said first gate opening at a closed position to thereby retain the fluid in the hopper, and wherein said first gate is hingedly connected about said first gate opening;

a first drive shaft supported within the hopper and rotatable in a gates-opening direction and a gates-closing direction, and having a shaft extension located exterior of the hopper;

a first crank arm fixed to said first drive shaft and coupled to said first gate by a first connecting link;

a first drive crank fixed to said shaft extension;

an electric linear actuator, having a linear electric driver operable to extend and retract an actuator rod, said actuator rod pivotally attached to a distal end of said first drive crank, and said linear electric driver fixed in position with respect to the hopper by an anchor pivot;

a linear drive controller coupled to provide electric current to said linear electric driver to thereby selectively extend and retract said actuator rod such that said drive crank induces rotation of said first drive shaft in either of said gates-opening or said gates-closing directions, and wherein rotation of said first drive shaft in said gates-opening direction is coupled through said first crank arm and said first connecting link to open said first gate, and to thereby enable control of the fluid flow from the hopper according to positioning of said actuator shaft by said linear drive controller.

2. The system of claim 1, and wherein:
said linear drive controller and said electric linear actuator apply holding torque though said drive cranks to said first drive shaft against rotation thereof.

3. The system of claim 1, and wherein:
said electric linear actuator is a linear electric motor having an electromagnetic stator and permanent magnet slider that correspond with said linear electric driver and said actuator rod, respectively.

4. The system of claim 1, and wherein:
said electric linear actuator is a ball screw actuator having a threaded rod and motor driven ball screw driver that correspond with said actuator rod and said linear electric driver, respectively.

5. The system of claim 1, and further comprising:
a brake disposed in fixed relationship with the hopper and operable to selectively prevent rotation of said first drive shaft.

6. The system of claim 1, and wherein:
said first crank arm and said first connecting link define an over-center geometry while said first gate is at said closed position, such that weight of the fluid on said first gate induces torque on said first drive shaft in said gates-closing direction.

7. The dump gate system of claim 1, and further comprising:
a linear position sensor electrically coupled to said linear drive controller, and aligned to detect an extension position of said actuator rod, to thereby provide actuator rod position feedback to said linear drive controller.

8. The system of claim 1, and further comprising:
a second gate opening located adjacent a lower portion of the hopper;
a second gate that sealably engages said second gate opening at a closed position to thereby retain the fluid in the hopper, and wherein said second gate is hingedly connected about said second gate opening;

30 a second crank arm fixed to said first drive shaft and coupled to said second gate by a second connecting link, and wherein rotation of said first drive shaft in said gates-opening direction is coupled to said second gate by said second crank arm and said second connecting link to open said second gate, to thereby enable control of the fluid flow from the hopper according to an angular position of said first drive shaft.

9. The dump gate system of claim 8, and wherein:
said first and second crank arms and said first and second connecting links are configured with a geometry whereby said first gate and said second gate open out of phase with one another as said first drive shaft is rotated in said gate-opening direction.

10. The system of claim 9, and wherein:
said first and second crank arms and said first and second connecting links define an over-center geometry while said first and second gates are at said closed positions, such that weight of the fluid on said first and second gates induces torque on said first and second drive shafts in said gates-closing directions.

11. A dump gate system for a hopper that contains fluid in a firefighting aircraft, comprising:
first and second gate openings formed through a lower portion of the hopper;
a first and second gates that sealably engage said first and second gate openings, respectively, at closed positions to thereby retain the fluid in the hopper, and wherein said first gate and said second gate are hingedly connected about said first and second gate openings, respectively;
first and second drive shafts, rotatably supported within the hopper, said first drive shaft having a shaft extension located exterior of the hopper;
first and second cranks arm fixed to said first and second drive shafts, respectively, and coupled to said first and second gates by first and second connecting links, respectively;
a shaft synchronizer engaged with said first and second drive shafts to synchronize rotation thereof in respective gate-opening and gate-closing directions;
a first drive crank fixed to said shaft extension;
an electric linear actuator, having a linear electric driver operable to extend and retract an actuator rod, said actuator rod pivotally attached to a distal end of said first drive crank, and said linear electric driver fixed in position with respect to the hopper by an anchor pivot;
a linear drive controller coupled to provide electric current to said linear electric driver to thereby selectively extend and retract said actuator rod such that said drive crank induces rotation of said first drive shaft in either of said gates-opening or said gates-closing directions, and wherein said first drive shaft correspondingly drives said second drive shaft through said shaft synchronizer, and wherein rotation of said first and second drive shafts in said gates-opening directions is coupled through said first and second crank arms and said first and second connecting links to open said first and second gates, and to thereby enable control of the fluid flow from the hopper according to positioning of said actuator shaft by said linear drive controller.

12. The system of claim 11, and wherein said shaft synchronizer further comprises:

a first phasing crank fixed to said first drive shaft and a second phasing crank fixed to said second drive shaft, and a phasing link pivotally coupling distal ends of said first and second phasing cranks to thereby synchronize rotation of said first and second drive shafts.

13. The system of claim 11, and wherein:

said linear drive controller and said electric linear actuator apply holding torque to said first and second drive shafts against rotation thereof.

14. The system of claim 11, and wherein:

said electric linear actuator is a linear electric motor having an electromagnetic stator and permanent magnet slider that correspond with said linear electric driver and said actuator rod, respectively.

15. The system of claim 11, and wherein:

said electric linear actuator is a ball screw actuator having a threaded rod and motor driven ball screw driver that correspond with said actuator rod and said linear electric driver, respectively.

16. The system of claim 11, and further comprising:

a brake disposed in fixed relationship with the hopper and operable to selectively prevent rotation of said first and second drive shafts.

17. The dump gate system of claim 11, and further comprising:

a linear position sensor electrically coupled to said linear drive controller, and aligned to detect an extension position of said actuator rod, to thereby provide actuator rod position feedback to said linear drive controller.

18. The dump gate system of claim 11, and wherein:

said first and second crank arms and said first and second connecting links are configured with a geometry whereby said first and second gates open out of phase with one another as said first and second drive shafts are rotated in said gate-opening directions.

19. A dump gate system for a hopper that contains fluid in a firefighting aircraft, comprising:

first and second gate openings formed through a lower portion of the hopper;

a first and second gates that sealably engage said first and second gate openings, respectively, at closed positions to thereby retain the fluid in the hopper, and wherein said first gate and said second gate are hingedly connected about said first and second gate openings, respectively;

first and second drive shafts, rotatably supported within the hopper in either of a gates-opening or a gates-closing directions, said first drive shaft having a first shaft extension located exterior of the hopper, and said second drive shaft having a second shaft extension located exterior of the hopper;

first and second cranks arm fixed to said first and second drive shafts, respectively, and coupled to said first and second gates by first and second connecting links, respectively;

a first drive crank fixed to said first shaft extension, and a second drive crank fixed to said second shaft extension;

a first electric linear actuator, having a first linear electric driver operable to extend and retract a first actuator rod, said first actuator rod pivotally attached to a distal end of said first drive crank, and said first linear electric driver fixed in position with respect to the hopper by a first anchor pivot;

a second electric linear actuator, having a second linear electric driver operable to extend and retract a second actuator rod, said second actuator rod pivotally attached to a distal end of said second drive crank, and said second linear electric driver fixed in position with respect to the hopper by a second anchor pivot;

a linear drive controller coupled to provide electric current to said first and second linear electric driver to thereby selectively extend and retract said first and second actuator rods such that said first and second drive cranks induce rotation of said first and second drive shafts, respectively, in either of said gates-opening or said gates-closing directions, and wherein rotation of said first and second drive shafts in said gates-opening directions is coupled through said first and second crank arms and said first and second connecting links to open said first and second gates, and to thereby enable control of the fluid flow from the hopper according to positioning of said actuator shaft by said linear drive controller.

20. The system of claim 19, and wherein:

said first and second electric linear actuators are linear electric motors having an electromagnetic stator and permanent magnet slider that correspond with said linear electric drivers and said actuator rods, respectively.

21. The system of claim 19, and wherein:

said first and second crank arms and said first and second connecting links define an over-center geometry while said first and second gates are at said closed positions, such that weight of the fluid on said first and second gates induces torque on said first and second drive shafts, respectively, in said gates-closing directions.

22. The dump gate system of claim 19, and further comprising:

a first and second linear position sensors electrically coupled to said linear drive controller, and aligned to detect an extension position of said first and second actuator rods, to thereby provide actuator rods position feedback to said linear drive controller.

* * * * *